United States Patent
Luo et al.

(10) Patent No.: US 8,737,502 B2
(45) Date of Patent: May 27, 2014

(54) MULTIPLEXING AND CODING SCHEMES FOR MULTIPLE TRANSMIT ANTENNAS IN A WIRELESS COMMUNICATION SYSTEM

(75) Inventors: Xiliang Luo, Northridge, CA (US); Peter Gaal, San Diego, CA (US); Wanshi Chen, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/687,576

(22) Filed: Jan. 14, 2010

(65) Prior Publication Data

US 2010/0202559 A1    Aug. 12, 2010

Related U.S. Application Data

(60) Provisional application No. 61/151,131, filed on Feb. 9, 2009, provisional application No. 61/151,157, filed on Feb. 9, 2009.

(51) Int. Cl.
*H04B 7/02* (2006.01)

(52) U.S. Cl.
USPC ........... 375/267; 375/260; 375/295; 375/299; 375/316; 375/347; 455/101; 455/132; 455/500; 455/562.1; 370/334; 370/464; 370/480

(58) Field of Classification Search
USPC ................. 375/260, 267, 295, 299, 316, 347; 455/101, 132, 500, 562.1; 370/334, 370/464, 480
See application file for complete search history.

(56) References Cited

U.S. PATENT DOCUMENTS 6,356,528 B1 *   3/2002   Lundby et al. ................ 370/209
7,460,581 B2 * 12/2008   Serratore et al. .............. 375/146

(Continued)

FOREIGN PATENT DOCUMENTS

CN          1698274 A       11/2005
CN          1701556 A       11/2005

(Continued)

OTHER PUBLICATIONS

Fung C Y et al: "Space-time coded decorrelating RAKE receiver for fast fading CDMA channels" Vehicular Technology Conference, 2003. VTC 2003-FALL. 2003 IEEE 58TH Orlando, FL, USA Oct. 6-9, 2003; [IEEE Vehicular Technolgy Conference], Piscataway, NJ, USA,IEEE, US LNKD-DOI:10.1109/VETECF.2003.1285093, Oct. 6, 2003 (Oct. 6, 2003), pp. 628-631 vol. 1, XP010700781 ISBN: 978-0-7803-7954-1 the whole document.

(Continued)

*Primary Examiner* — Leon Flores
(74) *Attorney, Agent, or Firm* — Peng Zhu

(57) ABSTRACT

Techniques for transmitting data from multiple transmit antennas using space orthogonal resource transmit diversity (SORTD) are described. For the SORTD scheme, a different orthogonal resource may be assigned to each transmit antenna. Data may be sent from the multiple transmit antennas using multiple orthogonal resources. In one design, a UE may process at least one information bit (e.g., with joint or independent coding) to obtain first and second sets of at least one modulation symbol. The UE may process the first set of modulation symbol(s) for transmission from the first transmit antenna using a first orthogonal resource. The UE may process the second set of modulation symbol(s) for transmission from the second transmit antenna using a second orthogonal resource. Each orthogonal resource may include a different reference signal sequence or a different set of reference signal sequence and orthogonal sequence.

59 Claims, 13 Drawing Sheets

(56) References Cited

U.S. PATENT DOCUMENTS

| | | | |
|---|---|---|---|
| 7,660,228 | B2 | 2/2010 | Wang et al. |
| 8,005,153 | B2* | 8/2011 | Muharemovic et al. ...... 375/259 |
| 2002/0075832 | A1* | 6/2002 | Kim et al. ...................... 370/335 |
| 2003/0103584 | A1 | 6/2003 | Bjerke et al. |
| 2004/0077378 | A1* | 4/2004 | Kim et al. .................. 455/562.1 |
| 2008/0298502 | A1* | 12/2008 | Xu et al. ........................ 375/299 |
| 2010/0034312 | A1* | 2/2010 | Muharemovic et al. ...... 375/267 |
| 2011/0170489 | A1* | 7/2011 | Han et al. ...................... 370/328 |

FOREIGN PATENT DOCUMENTS

| | | |
|---|---|---|
| JP | 2002542713 A | 12/2002 |
| WO | WO0064073 | 10/2000 |
| WO | WO0247278 | 6/2002 |
| WO | WO03019849 | 3/2003 |
| WO | WO-2004012346 A2 | 2/2004 |
| WO | WO-2005055508 A1 | 6/2005 |
| WO | WO2005099126 | 10/2005 |
| WO | WO2007117218 | 10/2007 |

OTHER PUBLICATIONS

International Search Report and Written Opinion—PCT/US2010/023663, International Search Authority—European Patent Office—Oct. 5, 2010.

Nokia Siemens Networks et al: "UL Single User MIMO Schemes in LTE-Advanced" 3GPP Draft; R1-090727, 3RD Generation Partnership Project (3GPP), Mobile Competence Centre ; 650, Route Des Lucioles ; F-06921 Sophia-Antipolis Cedex ; France, no. Athens, Greece; 20090203, Feb. 3, 2009 (Feb. 3, 2009), XP050318594 [retrieved on Feb. 3, 2009] the whole document.

Partial International Search Report-PCT/US2010/023663-International Search Authority EPO-Jun. 2, 2010.

Qualcomm Europe: "Pucch Transmit Diversity," 3GPP TSG RAN WG1 #56, R1-090870, Feb. 9-13, 2009.

Samsung: "Discussions on UL 2TX Transmit Diversity Schemes in LTE-A," Feb. 3, 2009, R1-090614, 3GPP TSG RAN WG1 Meeting #56, Feb. 9-13, 2009.

3GPP TSG-RAN WG1#55bis, R1-090135, Evaluation of transmit diversity for PUCCH in LTE-A, Nortel, Jan. 12-16, 2009, Ljubljana, Slovenia.

3GPP TSG RAN WG1 #55 bis, R1-090216, PUCCH TxD Schemes for LTE-A, LG Electronics, Jan. 12-16, 2009, Ljubljana, Slovenia.
Taiwan Search Report—TW099104041—TIPO—Feb. 17, 2013.

* cited by examiner

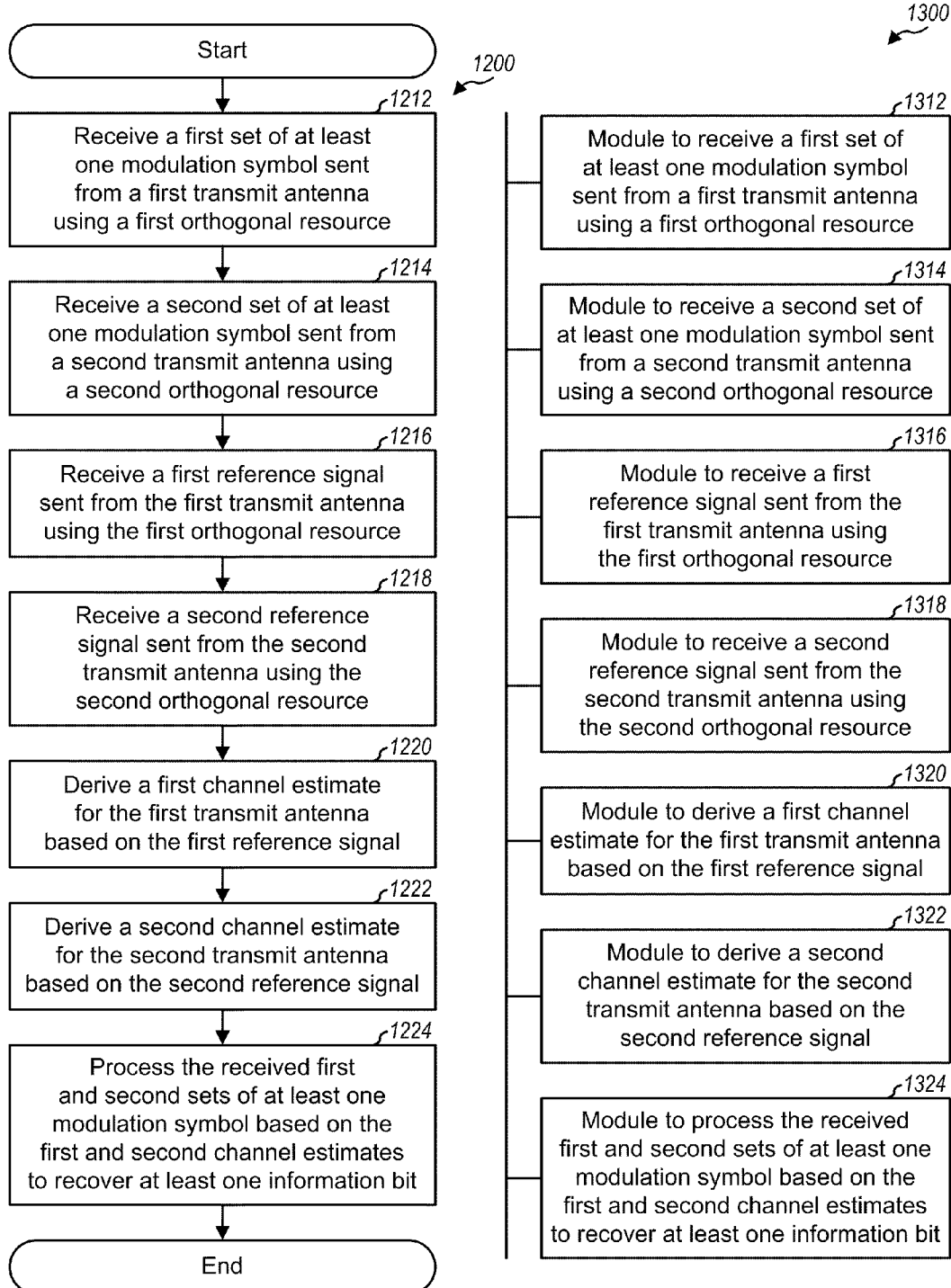

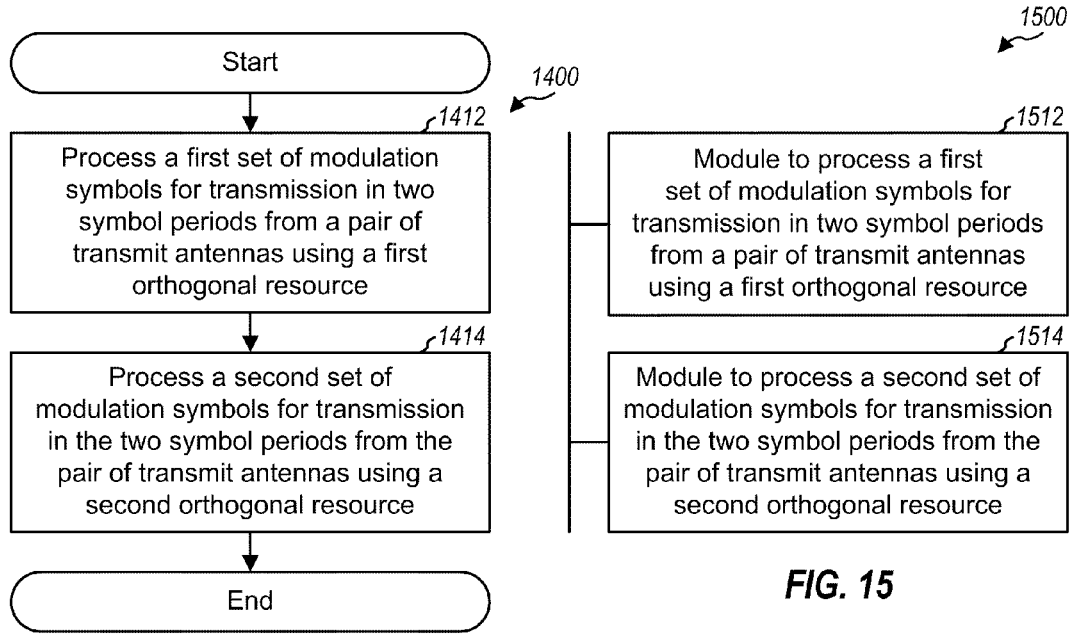
FIG. 14
FIG. 15
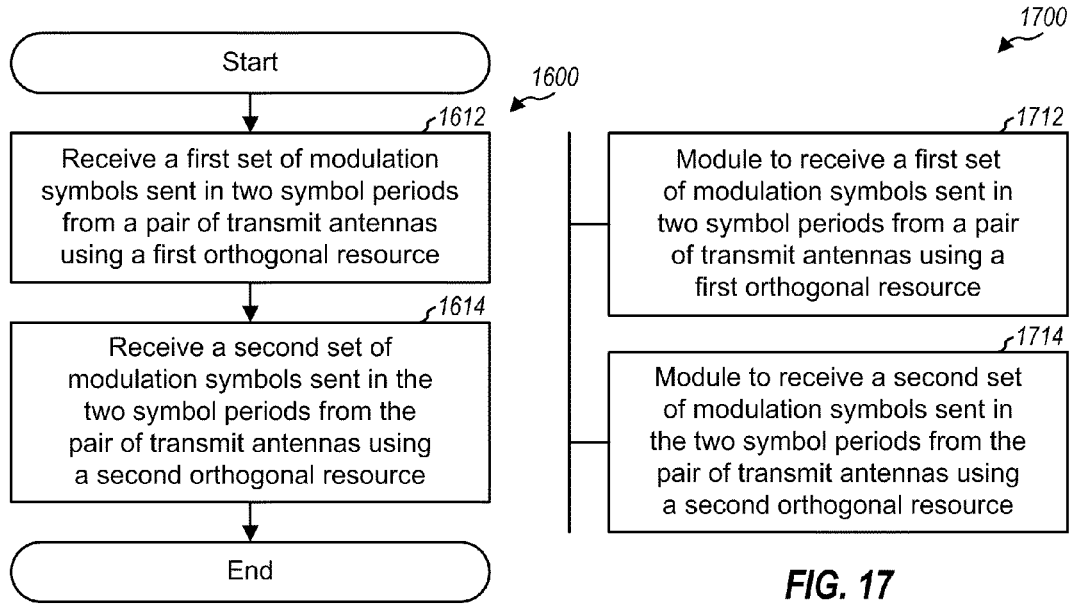
FIG. 16
FIG. 17

MULTIPLEXING AND CODING SCHEMES FOR MULTIPLE TRANSMIT ANTENNAS IN A WIRELESS COMMUNICATION SYSTEM

The present application claims priority to provisional U.S. Application Ser. No. 61/151,131, filed Feb. 9, 2009, and provisional U.S. Application Ser. No. 61/151,157, filed Feb. 9, 2009, both entitled "MULTIPLEXING AND CODING SCHEME FOR PUCCH IN LTE-A," and incorporated herein by reference.

BACKGROUND

I. Field

The present disclosure relates generally to communication, and more specifically to techniques for transmitting data from multiple transmit antennas in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support transmission of traffic data and/or control data from a transmitter equipped with multiple transmit antennas to (i) a receiver equipped with a single receive antenna and/or (ii) a receiver equipped with multiple receive antennas. It may be desirable to transmit data from the multiple transmit antennas such that good performance can be achieved.

SUMMARY

Techniques for transmitting data from multiple transmit antennas in a wireless communication system are described herein. In an aspect, a space orthogonal resource transmit diversity (SORTD) scheme may be used to support transmission of data (e.g., control data) from multiple transmit antennas. For the SORTD scheme, a different orthogonal resource may be assigned to each transmit antenna. Data may be sent from the multiple transmit antennas using multiple orthogonal resources.

In one design, a user equipment (UE) may process at least one information bit to obtain (i) a first set of at least one modulation symbol for a first transmit antenna and (ii) a second set of at least one modulation symbol for a second transmit antenna. The information bit(s) may be for channel quality indicator (CQI) information, acknowledgement (ACK) information, a scheduling request, other information, or a combination thereof. The UE may perform joint coding or independent coding on the information bit(s). The UE may process the first set of at least one modulation symbol for transmission from the first transmit antenna using a first orthogonal resource. The UE may process the second set of at least one modulation symbol for transmission from the second transmit antenna using a second orthogonal resource. Each orthogonal resource may comprise a different reference signal sequence or a different set of reference signal sequence and orthogonal sequence(s). The UE may also generate a first reference signal for transmission from the first transmit antenna using the first orthogonal resource. The UE may also generate a second reference signal for transmission from the second transmit antenna using the second orthogonal resource.

A base station may perform the complementary processing to receive the transmissions sent by the UE via the first and second transmit antennas. Various aspects and features of the disclosure are described in further detail below.

BRIEF DESCRIPTION OF THE DRAWINGS

FIGS. 12 and 13 show a process and an apparatus, respectively, for receiving data sent using the SORTD scheme.

FIGS. 14 and 15 show a process and an apparatus, respectively, for sending data using the SORTD with STBC scheme.

FIGS. 16 and 17 show a process and an apparatus, respectively, for receiving data using with the SORTD with STBC scheme.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) in both frequency division duplexing (FDD) and time division duplexing (TDD) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
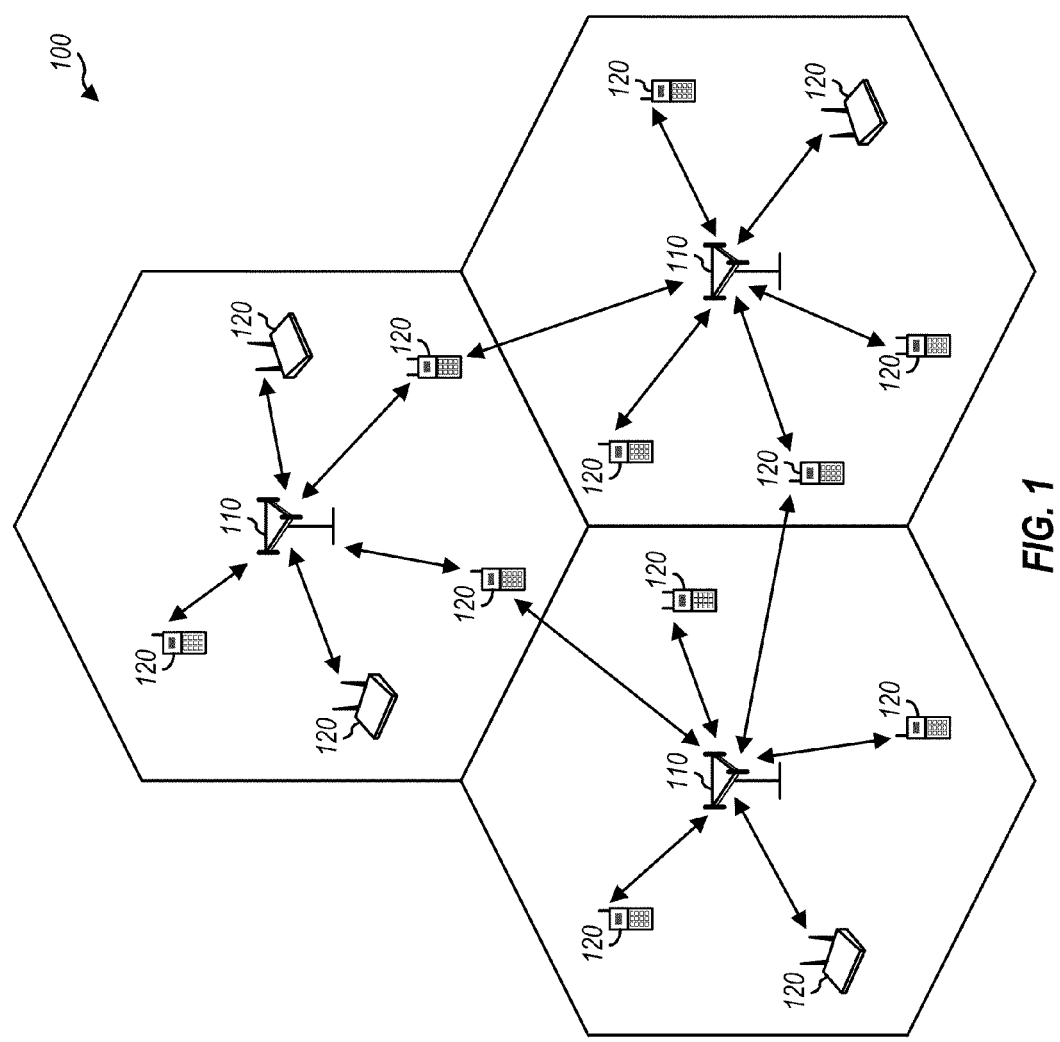
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a Node B, a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB on the downlink and uplink. The downlink (or forward link) refers to the communication link from the eNB to the UE, and the uplink (or reverse link) refers to the communication link from the UE to the eNB.

Figure 2:
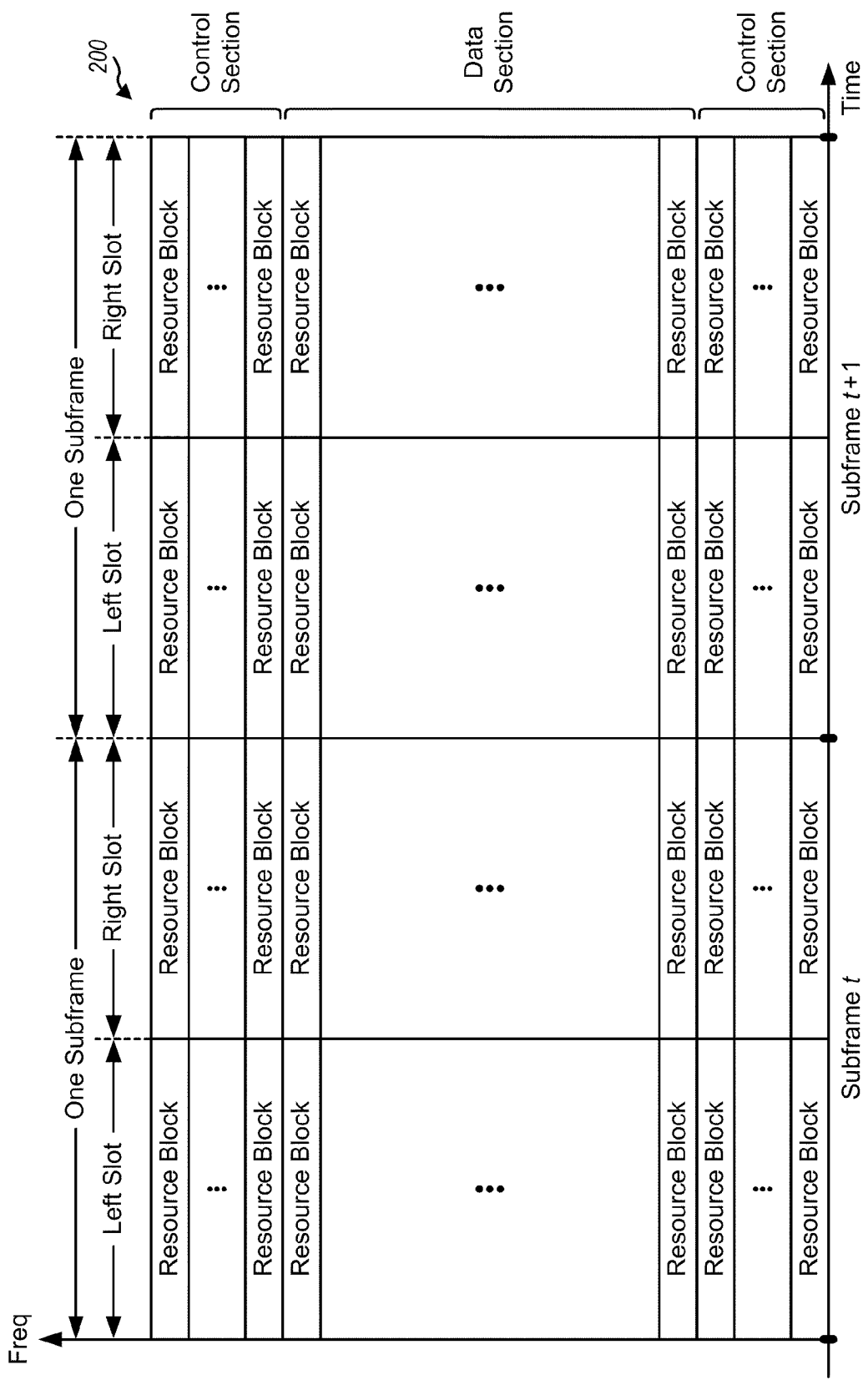
FIG. 2 shows an exemplary transmission structure.

FIG. 2 shows an exemplary transmission structure 200 that may be used for the uplink. The transmission timeline may be partitioned into units of subframes. A subframe may have a predetermined duration, e.g., one millisecond (ms), and may be partitioned into two slots. Each slot may include six symbol periods for an extended cyclic prefix or seven symbol periods for a normal cyclic prefix.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

For each of the downlink and uplink, multiple resource blocks may be defined in each slot with the $N_{FFT}$ total subcarriers. Each resource block may cover K subcarriers (e.g., K=12 subcarriers) in one slot. The number of resource blocks in each slot may be dependent on the system bandwidth and may range from 6 to 110. On the uplink, the available resource blocks may be divided into a data section and a control section. The control section may be formed at the two edges of the system bandwidth (as shown in FIG. 2) and may have a configurable size. The resource blocks in the control section may be assigned to UEs for transmission of control data. The data section may include all resource blocks not included in the control section. The design in FIG. 2 results in the data section including contiguous subcarriers, which may allow a single UE to be assigned all of the contiguous subcarriers in the data section.

A UE may be assigned resource blocks in the control section to transmit control data to an eNB. The control data may comprise CQI information, ACK information, a scheduling request (SR), etc. CQI information may comprise CQI indicative of the downlink channel quality estimated by the UE for the eNB, rank indicator (RI) indicative of the number of transport blocks or codewords to transmit simultaneously, precoding matrix indicator (PMI) indicative of a precoding matrix to use for transmission, etc. ACK information may convey whether each transport block sent by the eNB to the UE is decoded correctly or in error by the UE. A scheduling request may ask for resources for data transmission on the uplink by the UE.

The UE may transmit traffic data and/or control data at any given moment. Furthermore, the UE may transmit CQI information, ACK information, scheduling request, or a combination thereof, at any given moment. It may be desirable for the UE to transmit traffic data and/or control data such that a single-carrier waveform can be maintained regardless of whether only traffic data, or only control data, or both traffic data and control data are being sent. A single-carrier waveform may be obtained by sending data on a set of contiguous subcarriers using SC-FDMA. A single-carrier waveform may have a lower peak-to-average-power ratio, which may be desirable.

The UE may transmit only traffic data or both traffic data and control data on a Physical Uplink Shared Channel (PUSCH), which may be mapped to resource blocks in the data section. The UE may transmit only control data on a Physical Uplink Control Channel (PUCCH), which may be mapped to resource blocks in the control section. Different types of control data may be combined and sent together in order to maintain a single-carrier waveform. For example, ACK information may be sent alone on ACK resources, or with a scheduling request on SR resources, or with CQI information on CQI resources.

A number of PUCCH formats may be supported, e.g., as shown in Table 1. PUCCH format 1 may be used to convey information (e.g., a scheduling request) by the presence of absence of a transmission on the PUCCH. PUCCH formats 1a and 1b may be used to send one or two bits (e.g., of ACK information) in a single modulation symbol. PUCCH format 2 may be used to send 20 bits (e.g., of CQI information) in 10 modulation symbols. PUCCH formats 2a and 2b may be used to send 21 or 22 bits (e.g., of both CQI and ACK information) in 11 modulation symbols.

TABLE 1

PUCCH Formats

| PUCCH Format | Modulation Scheme | Number of Bits/Subframe | Number of Modulation Symbols/Subframe |
|---|---|---|---|
| 1 | — | N/A | N/A |
| 1a | BPSK | 1 | 1 |
| 1b | QPSK | 2 | 1 |
| 2 | QPSK | 20 | 10 |
| 2a | QPSK + BPSK | 21 | 11 |
| 2b | QPSK + QPSK | 22 | 11 |

Two PUCCH structures may be supported and may be referred to as an ACK structure and a CQI structure. The ACK structure may be used to send only ACK information and may support PUCCH formats 1a and 1b. The CQI structure may be used to send only CQI information or both ACK and CQI information and may support PUCCH formats 2, 2a and 2b.

A UE may send control data and a demodulation reference signal (DMRS) using a reference signal sequence having good correlation properties. A DMRS may also be referred to as a reference signal, pilot, etc. Different UEs may concurrently send control data and reference signals on the same resource block using different reference signal sequences, which may be generated from a common base sequence. The base sequence may be a CAZAC (constant amplitude zero auto correlation) sequence such as a Chu sequence, a Zardoff-Chu sequence, a Frank sequence, a generalized chirp-like (GCL) sequence, etc. The base sequence may also be a computer-generated sequence having good correlation properties.

Multiple reference signal sequences of length K may be generated with different cyclic shifts of a base sequence of length K, as follows:

$$r_\alpha(k) = e^{j\alpha k} \cdot r_b(k), \text{ for } k = 0, \ldots, K-1, \quad \text{Eq (1)}$$

where $r_b(k)$ is the base sequence, with k being a symbol index, and $r_\alpha(k)$ is a reference signal sequence with a cyclic shift of $\alpha$.

The base sequence may be sent in the frequency domain and may be cyclically shifted either by applying a phase ramp in the frequency domain, as shown in equation (1), or by performing a cyclic shift in the time domain. In one design, K=12 and each reference signal sequence has a length of 12. Up to 12 reference signal sequences may be generated with up to 12 different values of $\alpha$. Multiple reference signal sequences may also be generated in other manners.

Figure 3:
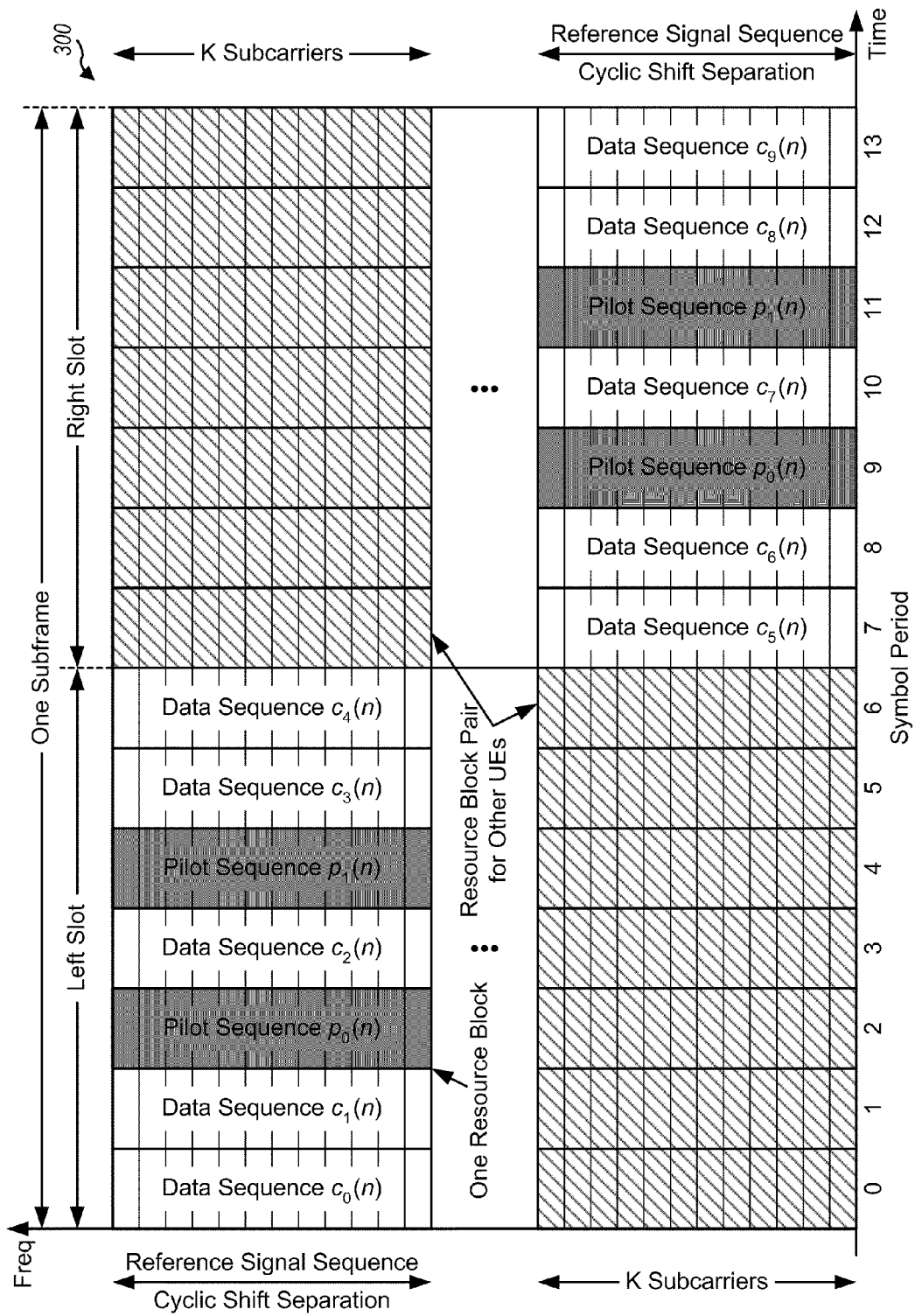
FIG. 3 shows an exemplary structure for sending CQI information.

FIG. 3 shows an exemplary CQI structure 300 for a case in which each slot includes seven symbol periods. In each subframe, the left slot includes seven symbol periods 0 through 6, and the right slot includes seven symbol periods 7 through 13. One or more UEs may concurrently send CQI and possibly ACK information on a resource block pair that includes (i) one resource block in the top (or bottom) control section in the left slot and (ii) one resource block in the bottom (or top) control section in the right slot. For CQI structure 300, a resource block includes five symbol periods for control data and two symbol periods for a reference signal. For the left slot, control data may be sent in symbol periods 0, 1, 3, 5 and 6, and a reference signal may be sent in symbol periods 2 and 4. For the right slot, control data may be sent in symbol periods 7, 8, 10, 12 and 13, and a reference signal may be sent in symbol periods 9 and 11. Control data and reference signal for CQI may also be sent in other symbol periods in a pair of resource blocks.

In one design, a UE may process control data for CQI (or both CQI and ACK) as follows. The UE may encode information bits for CQI to obtain 20 to 22 code bits, map the first 20 code bits to 10 modulation symbols d(0) to d(9), and map the last one or two code bits (if any) to modulation symbol d(10). The UE may then modulate its reference signal sequence r(k) with each modulation symbol d(n), as follows:

$$c_n(k) = d(n) \cdot r(k), \text{ for } k=0, \ldots, K-1 \text{ and } n=0, \ldots, 9, \quad \text{Eq (2)}$$

where $c_n(k)$ is the n-th data sequence for CQI. Data sequence $c_n(k)$ may also be referred to as a modulated reference signal sequence. Ten data sequences $c_0(k)$ to $c_9(k)$ may be obtained for the ten modulation symbols d(0) through d(9), respectively, and may be sent in ten symbol periods for control data in one resource block pair, e.g., as shown in FIG. 3.

In one design, the UE may generate a reference signal for CQI as follows:

$$p_l(k) = w(l) \cdot z(l) \cdot r(k), \text{ for } k=0, \ldots, K-1 \text{ and } l=0, \ldots, P-1, \quad \text{Eq (3)}$$

where z(l) is a modulation symbol to send in the reference signal, w(l) is an orthogonal sequence used to spread the reference signal, $p_l(k)$ is the l-th pilot sequence for CQI, and P is the number of symbol periods for reference signal for CQI.

z(l) may be equal to d(10) for PUCCH format 2a or 2b and may be equal to 1 for PUCCH format 2. w(f) may be equal to {1, 1} for two reference symbol periods with the normal cyclic prefix (as shown in FIG. 3) or equal to {1} for one reference symbol period with the extended cyclic prefix. As shown in equation (3), P pilot sequences $p_0(n)$ to $p_{P-1}(n)$ may be obtained by (i) modulating the reference signal sequence with modulation symbol z(l) and (ii) spreading the modulated reference signal sequence with orthogonal sequence w(l). The P pilot sequences may be sent in P symbol periods for reference signal in each resource block, e.g., as shown in FIG. 3.

In one design, 12 orthogonal resources may be defined for CQI and may be referred to as CQI resources. Each CQI resource may be associated with a different reference signal sequence and a common orthogonal sequence. Up to 12 UEs may concurrently send control data and reference signals for CQI on the same resource block pair using up to 12 CQI resources. The control data and reference signals from these UEs may be distinguished by separation of the reference signal sequences.

Figure 4:
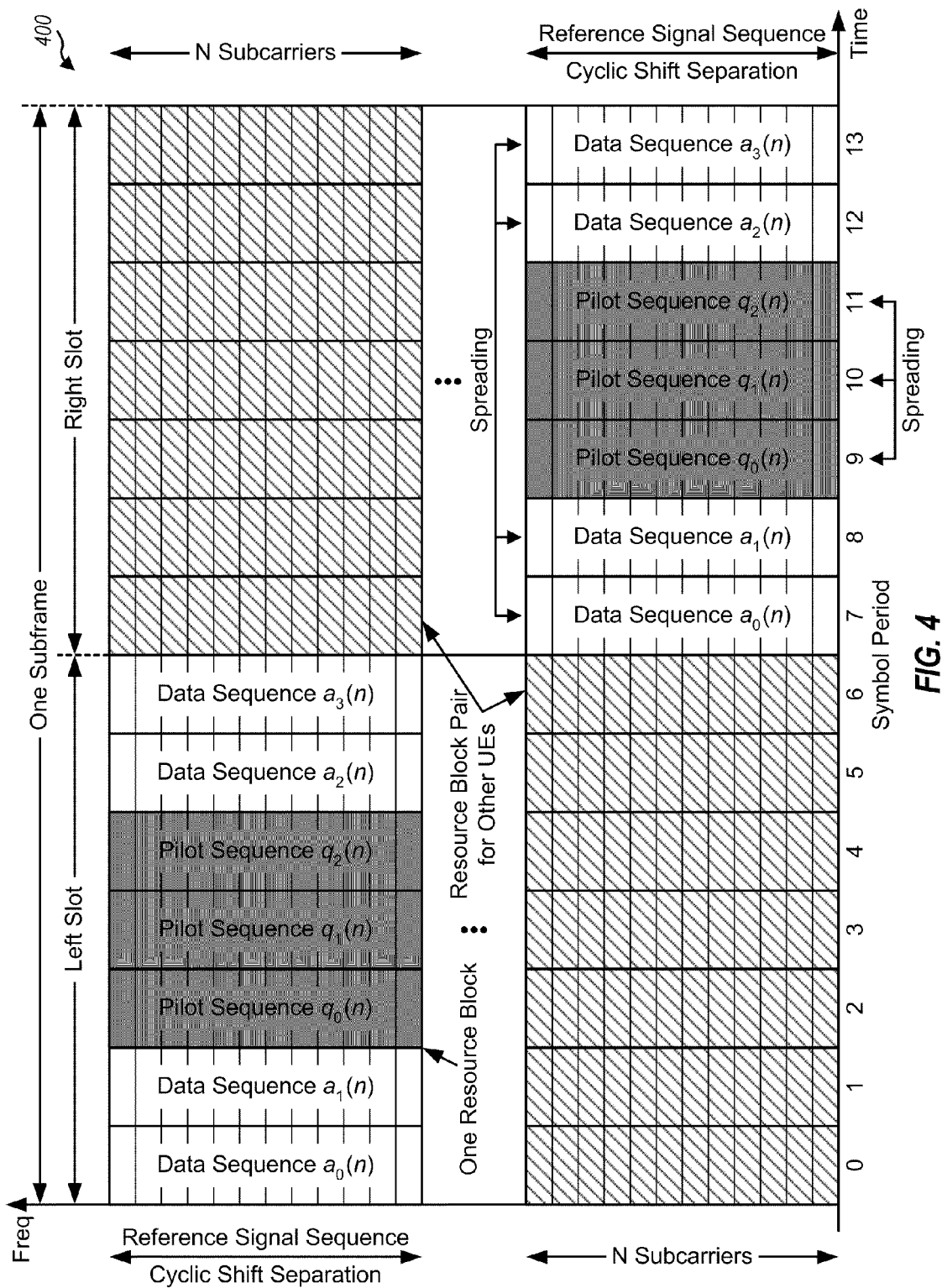
FIG. 4 shows an exemplary structure for sending ACK information.

FIG. 4 shows an exemplary ACK structure 400 for a case in which each slot includes seven symbol periods. For ACK structure 400, a resource block includes four symbol periods for control data and three symbol periods for a reference signal. For the left slot, control data may be sent in symbol periods 0, 1, 5 and 6, and a reference signal may be sent in symbol periods 2, 3 and 4. For the right slot, control data may be sent in symbol periods 7, 8, 12 and 13, and a reference signal may be sent in symbol periods 9, and 11. Control data and reference signal for ACK may also be sent in other symbol periods in a pair of resource blocks.

In one design, a UE may process control data for ACK as follows. The UE may map one or two bits for ACK to a modulation symbol d(0) based on BPSK or QPSK. The UE may then modulate and spread its reference signal sequence, as follows:

$$a_n(k) = w(n) \cdot d(0) \cdot r(k), \text{ for } k=0, \ldots K-1 \text{ and } n=0, \ldots, N-1, \quad \text{Eq (4)}$$

where w(n) is an orthogonal sequence used to spread control data for ACK, $a_n(k)$ is the n-th data sequence for ACK, and N is the number of symbol periods for control data for ACK.

As shown in equation (4), N data sequences $a_0(n)$ to $a_{N-1}(n)$ for ACK may be obtained by (i) modulating the reference signal sequence with modulation symbol d(0) and (ii) spreading the modulated reference signal sequence with orthogonal sequence w(n). The N data sequences may be sent in N symbol periods for control data in each resource block, e.g., as shown in FIG. 4.

In one design, the UE may generate a reference signal for ACK as follows:

$$q_l(k) = w(l) \cdot r(k), \text{ for } k=0, \ldots, K-1 \text{ and } l=0, \ldots, Q-1, \quad \text{Eq (5)}$$

where $q_l(k)$ is the l-th pilot sequence for ACK, and

Q is the number of symbol periods for reference signal for ACK.

As shown in equation (5), Q pilot sequences $q_0(n)$ to $q_{Q-1}(n)$ may be obtained by spreading the reference signal sequence with orthogonal sequence w(l). The Q pilot sequences may be sent in Q symbol periods for reference signal in each resource block, e.g., as shown in FIG. 4. Q may be equal to 2 for the extended cyclic prefix or 3 for the normal cyclic prefix. Two orthogonal sequences of length 2 may be defined based on a Walsh matrix. Three orthogonal sequences of length 3 may be defined based on a discrete Fourier transform (DFT) matrix. In general, Q orthogonal sequences of length Q may be defined based on a suitable Q×Q matrix.

In one design, a number of orthogonal resources may be defined for ACK and may be referred to as ACK resources. Each ACK resource may be associated with a specific reference signal sequence, a specific orthogonal sequence for control data, and a specific orthogonal sequence for reference signal. There may be three orthogonal sequences of length 3 for reference signal. For control data, there may be three orthogonal sequences of length 3 for the extended cyclic prefix or four orthogonal sequences of length 4 for the normal cyclic prefix. Thus, 36 ACK resources may be defined with 12 reference signal sequences (obtained with 12 different cyclic shifts of a common base sequence) and 3 orthogonal sequences of length 3. The number of ACK resources may be limited by the number of orthogonal sequences for reference signal. Up to 36 UEs may concurrently send control data and reference signals for ACK on the same resource block pair using up to 36 ACK resources. The control data and reference signals from these UEs may be distinguished by (i) separation of the reference signal sequences and (ii) spreading with the orthogonal sequences in the time domain.

In general, a number of orthogonal resources may be defined with the available reference signal sequences and the available orthogonal sequences. Each orthogonal resource may be associated with a specific reference signal sequence and one or more specific orthogonal sequences. Different UEs may be assigned different orthogonal resources and may concurrently send control data and reference signals on the same resource block using their assigned orthogonal resources.

In an aspect, a space orthogonal resource transmit diversity (SORTD) scheme may be used to support transmission of data (e.g., control data) from multiple transmit antennas. For the SORTD scheme, a different orthogonal resource may be assigned to each transmit antenna. Data may be sent from the multiple transmit antennas using multiple orthogonal resources. SORTD may improve capacity and/or performance In general, SORTD may be used for any number of transmit antennas. For clarity, much of the description below is for two transmit antennas.

Figure 5:
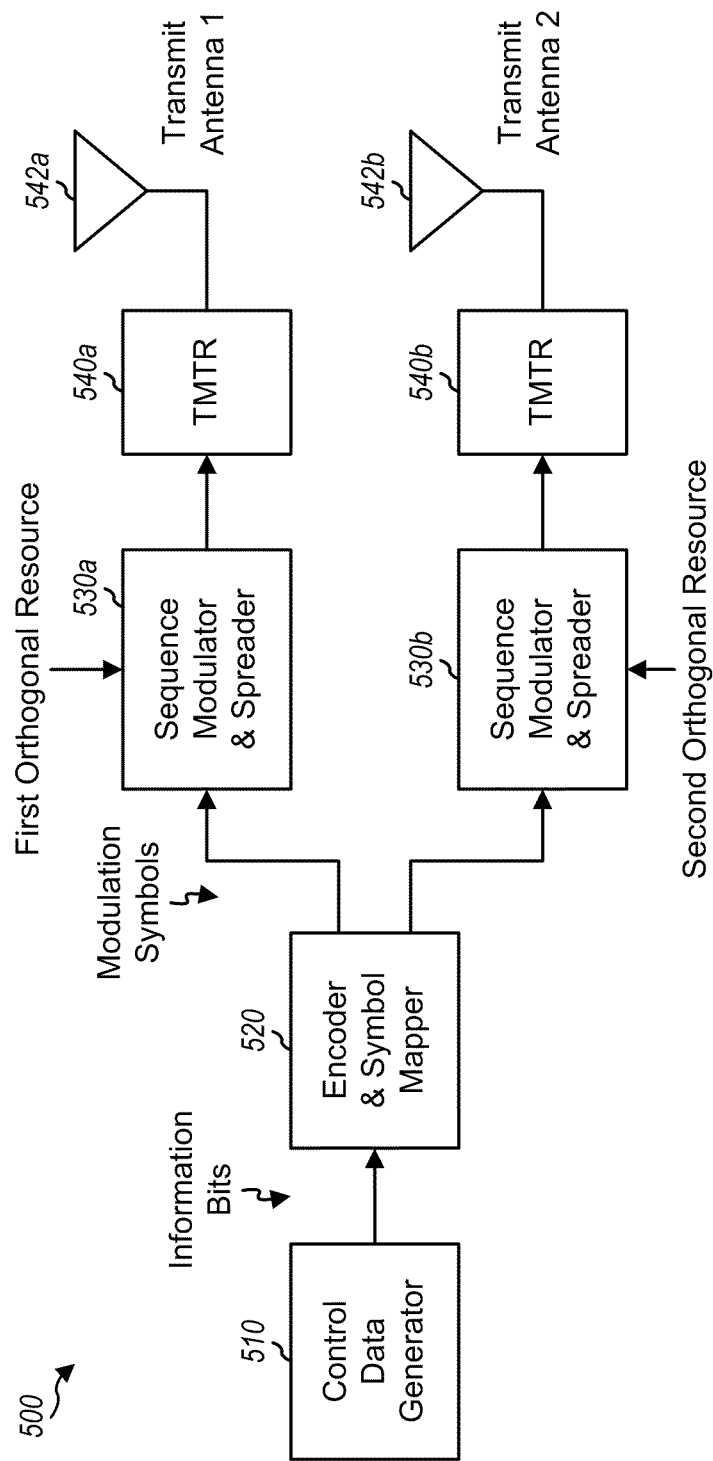
FIG. 5 shows a transmitter supporting SORTD for two transmit antennas.

FIG. 5 shows a block diagram of a design of a transmitter 500 supporting SORTD for two transmit antennas 542a and 542b. Within transmitter 500, a control data generator 510 may generate information bits for control data, which may comprise ACK information, CQI information, a scheduling request, etc. An encoder and symbol mapper 520 may encode the information bits to obtain code bits and may further map the code bits to modulation symbols, as described below. Unit 520 may provide (i) a first set of at least one modulation symbol to a sequence modulator and spreader 530a for the first transmit antenna 542a and (ii) a second set of at least one modulation symbol to a sequence modulator and spreader 530b for the second transmit antenna 542b.

Unit 530a may process the first set of modulation symbol(s) and a first reference signal based on a first orthogonal resource assigned to the first transmit antenna. Similarly, unit 530b may process the second set of modulation symbol(s) and a second reference signal based on a second orthogonal resource assigned to the second transmit antenna. The processing by units 530a and 530b may be dependent on the type of control data being sent. For example, each unit 530 may process its set of modulation symbol(s) as shown in equation (2) or (4) to obtain data sequences. Each unit 530 may also process its reference signal, e.g., as shown in equation (3) or (5) to obtain pilot sequences. Each unit 530 may multiplex the data sequences and the pilot sequences, e.g., as shown in FIG. 3 or 4.

A transmitter unit (TMTR) 540a may process the data and pilot sequences from unit 530a and generate a first modulated signal, which may be transmitted via the first transmit antenna 542a. A transmitter unit 540b may process the data and pilot sequences from unit 530b and generate a second modulated signal, which may be transmitted via the second transmit antenna 542b.

For the SORTD scheme, different orthogonal resources may be used for control data sent from the two transmit antennas. An eNB may recover the control data sent from each transmit antenna based on the orthogonal resource used for that transmit antenna. Different orthogonal resources may also be used for the reference signals sent from the two transmit antennas. This may allow the eNB to derive a channel estimate for each transmit antenna based on the reference signal received from that transmit antenna. The channel estimate for each transmit antenna may be used for coherent demodulation of the control data sent from that transmit antenna.

The encoding and demultiplexing by unit 520 may be performed in various manners. Some designs of encoding and demultiplexing are described below.

Figure 6A:
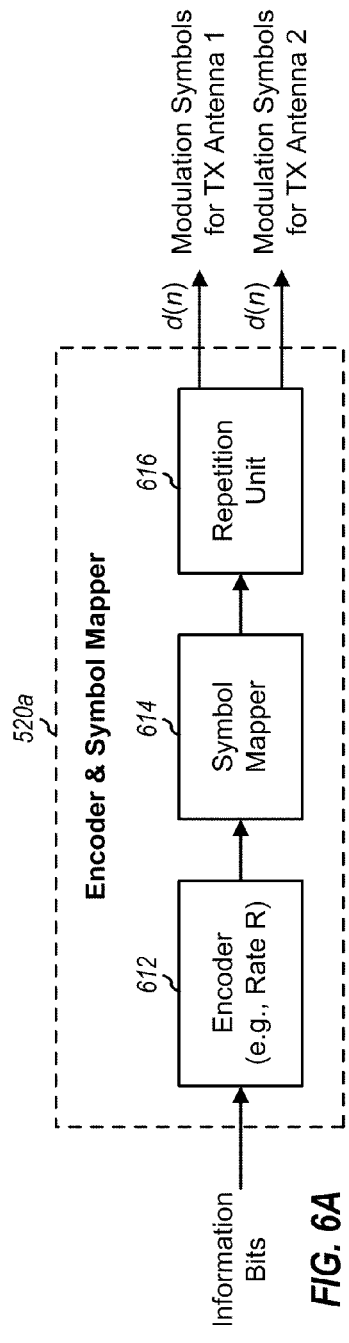
FIGS. 6A to 6D show four designs of an encoder and symbol mapper.

FIG. 6A shows a block diagram of a design of an encoder and symbol mapper 520a with repetition. Unit 520a is one design of encoder and symbol mapper 520 in FIG. 5. Within unit 520a, an encoder 612 may receive M information bits of control data and may encode the information bits with a rate R code to obtain a codeword comprising M/R code bits. The number of information bits (M) may be dependent on which type(s) of control data are being sent. The code rate (R) may be any suitable value smaller than one and may be selected based on the number of information bits and the desired number of code bits. A symbol mapper may map the code bits to modulation symbols d(n) based on a selected modulation scheme. A repetition unit 616 may provide the same modulation symbols d(n) for both the first and second transmit antennas. Although not shown in FIG. 6A, a channel interleaver may be added after encoder 612 to interleave (i.e., reorder or permute) either the code bits or the modulation symbols.

In the design shown in FIG. 6A, the same modulation symbols may be sent from all transmit antennas. Encoder 612 may perform encoding in similar manner as for a case in which control data is sent from a single transmit antenna, e.g., encoding as specified for control data sent on the uplink in LTE Release 8.

Figure 6B:
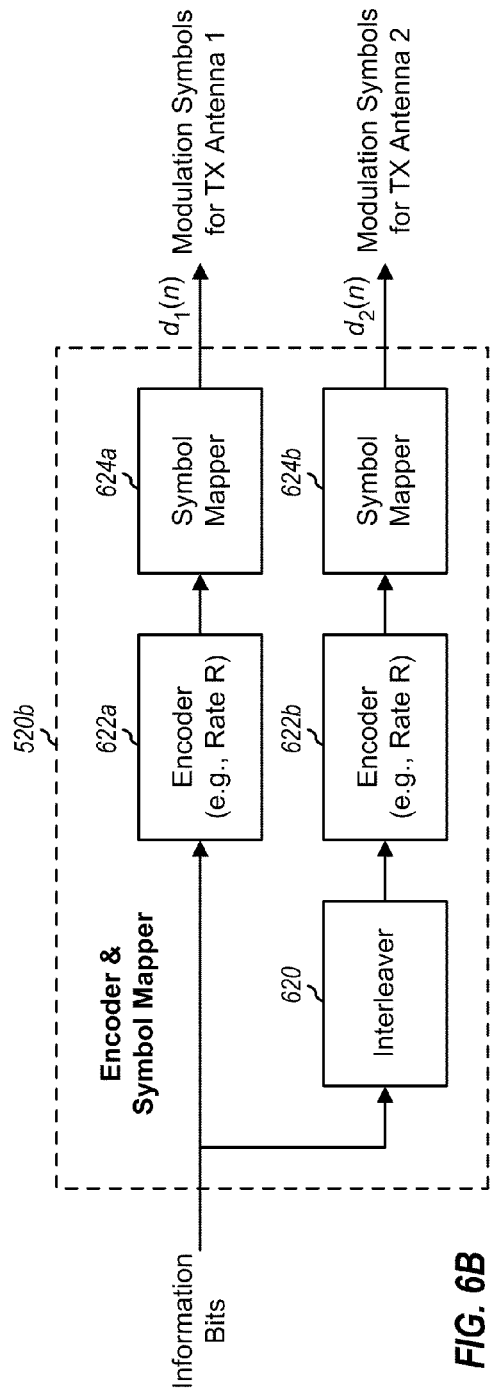

FIG. 6B shows a block diagram of a design of an encoder and symbol mapper 520b with interleaving. Unit 520b is another design of encoder and symbol mapper 520 in FIG. 5. Within unit 520b, an encoder 622a may receive and encode information bits with a rate R code and provide code bits. A symbol mapper 624a may map the code bits from encoder 622a to modulation symbols $d_1(n)$ for the first transmit antenna. An interleaver 620 may interleave the information bits and provide interleaved bits. An encoder 622b may encode the interleaved bits with a rate R code and provide code bits. A symbol mapper 624b may map the code bits from encoder 622b to modulation symbols $d_2(n)$ for the second transmit antenna.

In the design shown in FIG. 6B, the same encoder may be used for both transmit antennas. However, the information bits are interleaved prior to being applied to encoder 622b for the second transmit antenna. The interleaving would result in the information bits being mapped to two different codewords by encoders 622a and 622b. Although not shown in FIG. 6B, different channel interleavers may be added after encoders 622a and 622b to permute either the code bits or the modulation symbols for the two transmit antennas.

Figure 6C:
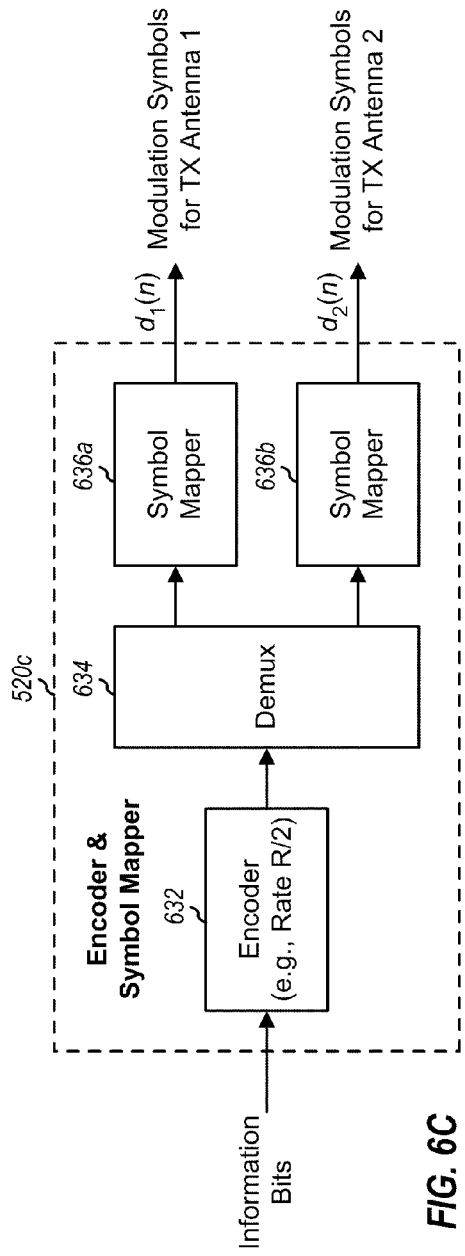

FIG. 6C shows a block diagram of a design of an encoder and symbol mapper 520c with joint coding. Unit 520c is yet another design of encoder and symbol mapper 520 in FIG. 5.

Within unit 520c, an encoder 632 may receive information bits to send, encode the information bits with a rate R/2 (or higher) code, and provide twice the number of code bits. Encoder 632 may implement a tail biting convolutional code (TBCC), a block code, and/or some other code. A demultiplexer (Demux) 634 may provide some of the code bits (e.g., code bits with even-numbered indices) to a symbol mapper 636a for the first transmit antenna and may provide the remaining code bits (e.g., code bits with odd-numbered indices) to a symbol mapper 636b for the second transmit antenna. Symbol mapper 636a may map its code bits to modulation symbols $d_1(n)$ for the first transmit antenna. Symbol mapper 636b may map its code bits to modulation symbols $d_2(n)$ for the second transmit antenna. Although not shown in FIG. 6C, a channel interleaver may be added after encoder 632 to permute the code bits, or different channel interleavers may be added after symbol mappers 636a and 636b to permute the modulation symbols for the two transmit antennas. Encoder 632 may implement a code that may be dependent on the number of information bits being sent.

In general, for the joint coding scheme, information bits may be encoded with a suitable code rate to obtain a codeword comprising T times the number of code bits for T transmit antennas, where T may be any value greater than one. Different parts of the codeword may be sent on different transmit antennas. Additional coding gain may be achieved by encoding M information bits with a code rate of R/T to obtain M·T/R code bits, where M may be the number of information bits sent from a single transmit antenna in a baseline scheme, e.g., by a UE supporting LTE Release 8. Alternatively, more than M information bits may be encoded with a code rate between R and R/T to obtain M·T/R code bits. The joint coding scheme may thus support transmission of a larger control data payload in comparison to the baseline scheme.

Figure 6D:
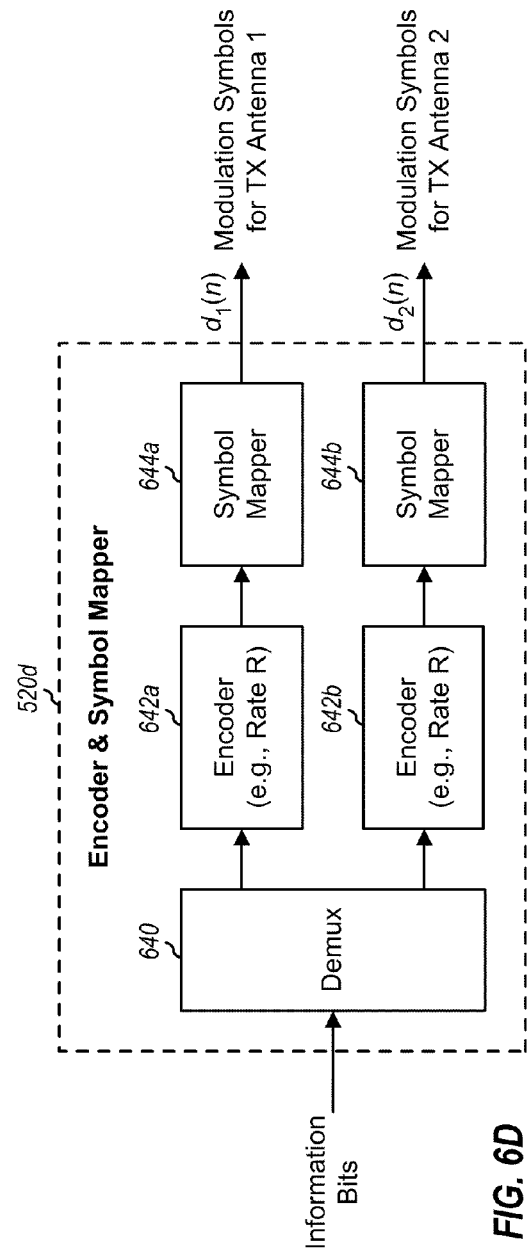

FIG. 6D shows a block diagram of a design of an encoder and symbol mapper 520d with independent coding. Unit 520d is yet another design of encoder and symbol mapper 520 in FIG. 5. Within unit 520d, a demultiplexer 640 may receive information bits to be sent, may provide some (e.g., about half) of the information bits to an encoder 642a for the first transmit antenna, and may provide the remaining information bits to an encoder 642b for the second transmit antenna. Encoder 642a may encode its information bits with a rate R code and provide code bits. A symbol mapper 644a may map the code bits from encoder 642a to modulation symbols $d_1(n)$ for the first transmit antenna. Encoder 642b may encode its information bits with a rate R code and provide code bits. A symbol mapper 644b may map the code bits from encoder 642b to modulation symbols $d_2(n)$ for the second transmit antenna. Encoders 642a and 642b may have the same code rate (as shown in FIG. 6D) or may have different code rates, which may be dependent on the number of information bits provided to each encoder 642. Although not shown in FIG. 6D, channel interleavers may be added after encoders 642a and 642b to permute either the code bits or the modulation symbols for the two transmit antennas.

For the independent coding scheme, different information bit(s) may be sent from each transmit antenna. The information bits for each transmit antenna may be processed separately based on a code rate and a modulation scheme selected for that transmit antenna. The processing for each transmit antenna may be similar to the processing for the baseline scheme to send information bits from one transmit antenna.

FIGS. 6A to 6D show four exemplary encoding and symbol mapping schemes to process information bits and generate modulation symbols for transmission from multiple transmit antennas using different orthogonal resources. The encoding and symbol mapping may also be performed in other manners. The joint coding and independent coding schemes may support transmission of more control data from multiple transmit antennas in comparison to the baseline scheme that transmits control data from a single transmit antenna. The joint coding and independent coding schemes may also provide spatial diversity gain through the use of multiple transmit antennas. A combination of schemes may also be used. For example, the repetition scheme may be used when transmitting a particular number of information bits (e.g., 11 or fewer information bits). The joint coding or independent coding scheme may be used when transmitting more than the particular number of information bits.

The SORTD scheme may support transmission of different control data from multiple transmit antennas using different orthogonal resources. As an example for a case with two transmit antennas, ACK information may be sent from one transmit antenna, and a scheduling request may be sent concurrently from the other transmit antenna. As another example, at least one ACK bit may be sent from one transmit antenna, and at least one additional ACK bit may be sent from the other transmit antenna. The processing shown in FIG. 6D may be used to send different control data from different transmit antennas.

The SORTD scheme may also support transmission of control data with joint coding in the spatial domain. As an example, for the case with two transmit antennas, each transmit antenna may be assigned a different reference signal and may be able to send 10 or 11 modulation symbols. A total of 40 to 44 code bits may be sent from the two transmit antennas with QPSK. A normal control data payload (e.g., of CQI and/or ACK information) may be processed with a lower code rate to obtain the desired number of code bits. Alternatively, a larger control data payload may be encoded with code rate R or lower to obtain the desired number of code bits.

The SORTD scheme may provide various advantages. First, improved performance and/or greater capacity may be achieved with the SORTD scheme over the baseline scheme. Second, a single-carrier waveform may be maintained for each transmit antenna. Third, each of the multiple transmit antennas may be treated in similar manner as a UE with a single transmit antenna in LTE Release 8. This may simplify processing at a UE equipped with multiple transmit antennas as well as an eNB. Fourth, the SORTD scheme may be used for all PUCCH formats. Other advantages may also be obtained with the SORTD scheme.

In another aspect, a space-time block code (STBC) scheme may be used to support transmission of data (e.g., control data) from two transmit antennas. For the STBC scheme, a pair of modulation symbols may be sent from two transmit antennas in two symbol periods using a single orthogonal resource in each symbol period. Different orthogonal resources may be used for reference signals from the two transmit antennas.

In one design, data sequences may be generated for two transmit antennas 1 and 2 in two symbol periods n and n+1, as follows:

$$c_n^1(k) = d(u) \cdot r_n(k), \quad \text{Eq (6)}$$

$$c_n^2(k) = d^*(v) \cdot r_n(k), \quad \text{Eq (7)}$$

$$c_{n+1}^1(k) = d(v) \cdot r_{n+1}(k), \text{ and} \quad \text{Eq (8)}$$

$$c_{n+1}^2(k) = -d^*(u) \cdot r_{n+1}(k), \quad \text{Eq (9)}$$

"*" denotes a complex conjugate.

where d(u) and d(v) are two modulation symbols to send in two symbol periods, $r_n(k)$ and $r_{n+1}(k)$ are reference signal sequences to use in the two symbol periods, $c_n^1(k)$ and $c_{n+1}^1(k)$ are two data sequences for transmit antenna 1 in the two symbol periods, $c_n^2(k)$ and $c_{n+1}^2(k)$ are two data sequences for transmit antenna 2 in the two symbol periods, and As shown in equations (6) to (9), two modulation symbols d(u) and d(v) may be sent (i) from the first and second transmit antennas, respectively, in symbol period n and (ii) from the second and first transmit antennas, respectively, in symbol period n+1. The modulation symbols sent from the second transmit antenna may be conjugated and/or negated to facilitate recovery of the modulation symbols by an eNB. In general, the same or different reference signal sequences may be used for the two symbol periods. In either case, the same reference signal sequence is used for both transmit antennas in each symbol period.

In one design, pilot sequences may be generated for the two transmit antennas 1 and 2 in two symbol periods n1 and n2, as follows:

$$p_{n1}^1(k)=r_{n1}(k), p_{n2}^1(k)=r_{n2}(k), \quad \text{Eq (10)}$$

$$p_{n2}^2(k)=r_{n1}(k), p_{n2}^2(k)=-r_{n2}(k), \quad \text{Eq (11)}$$

where $p_{n1}^1(k)$ and $p_{n2}^1(k)$ are two pilot sequences for transmit antenna 1 in the two symbol periods, and $p_{n1\,1}^2(k)$ and $p_{n2}^2(k)$ are two pilot sequences for transmit antenna 2 in the two symbol periods.

Figure 7:
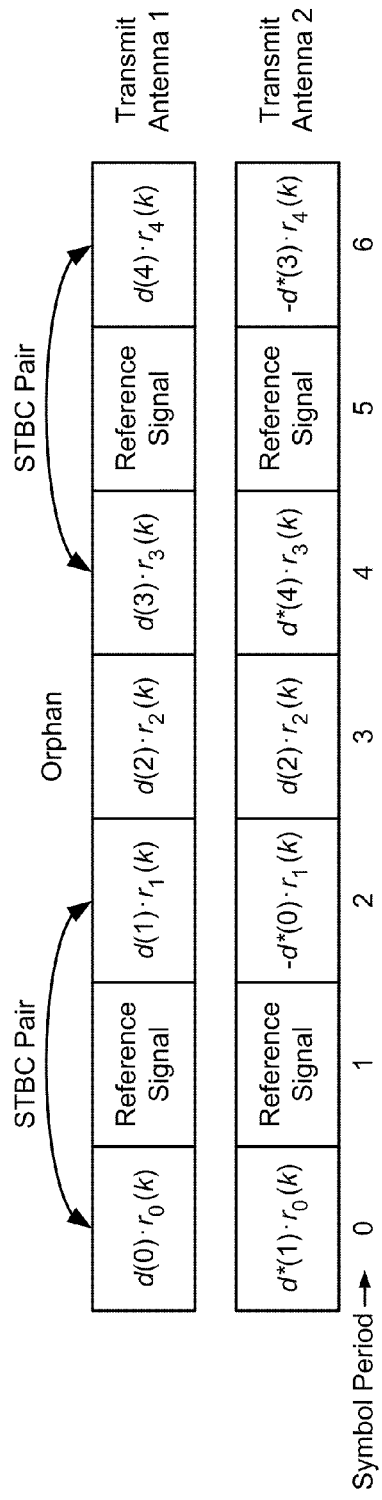
FIG. 7 shows a space time block code (STBC) scheme.

As shown in equations (10) and (11), an orthogonal sequence of {1, 1} may be used for the pilot sequences for one transmit antenna, and an orthogonal sequence of {1, −1} may be used for the pilot sequences for the other transmit antenna. Multiplexing capability for reference signals may be doubled by using two orthogonal sequences for the two transmit antennas. In another design, two reference signal sequences and a single orthogonal sequence {1, 1} may be used for reference signals sent from the two transmit antennas. In general, the same or different reference signal sequences may be used for the two symbol periods for pilots. In either case, the same reference signal sequence is used for both transmit antennas in each symbol period FIG. 7 shows a design of the STBC scheme for the CQI structure shown in FIG. 3. In the example shown in FIG. 7, modulation symbols are sent in five symbol periods, and reference signals are sent in two symbol periods of one slot. A first pair of modulation symbols d(0) and d(1) is sent from two transmit antennas in symbol periods 0 and 2 using the STBC scheme. A second pair of modulation symbols d(3) and d(4) is sent from the two transmit antennas in symbol periods 4 and 6 using the STBC scheme. A single modulation symbol d(2) is sent from the two transmit antennas in symbol period 3 using repetition. Pilot sequences are sent from the two transmit antennas in symbol periods 1 and 5.

In yet another aspect, a combination of SORTD and STBC may be used to extend the transmission capability of STBC and improve capacity and/or performance. For the SORTD with STBC scheme, a UE may be assigned multiple orthogonal resources with SORTD. The UE may process control data based on STBC for each orthogonal resource to obtain two symbol streams for two transmit antennas for the orthogonal resource. The UE may combine all symbol streams for each transmit antenna to obtain an output symbol stream for that transmit antenna.

In one design, data sequences may be generated for two transmit antennas 1 and 2 in two symbol periods n and n+1 for the SORTD with STBC scheme, as follows:

$$c_n^1(k)=d_1(u) \cdot r_n^1(k)+d_2(u) \cdot r^2(k), \quad \text{Eq (12)}$$

$$c_n^2(k)=d_1^*(v) \cdot r_n^1(k)+d_2^*(v) \cdot r_n^2(k), \quad \text{Eq (13)}$$

$$c_{n+1}^1(k)=d_1(v) \cdot r_{n+1}^1(k)+d_2(v) \cdot r_{n+1}^2(k), \text{ and} \quad \text{Eq (14)}$$

$$c_{n+1}^2(k)=-d_1^*(u) \cdot r_{n+1}^1(k) \cdot d_2^*(u) \cdot r_{n+1}^2(k), \quad \text{Eq (15)}$$

where $d_1(u)$ and $d_1(v)$ are modulation symbols to send with a first orthogonal resource, $d_2(u)$ and $d_2(v)$ are modulation symbols to send with a second orthogonal resource, $r_n^1(k)$ and $r_{n+1}^1(k)$ are reference signal sequences for the first orthogonal resource in the two symbol periods, and $r_n^2(k)$ and $r_{n+1}^2(k)$ are reference signal sequences for the second orthogonal resource.

Figure 8:
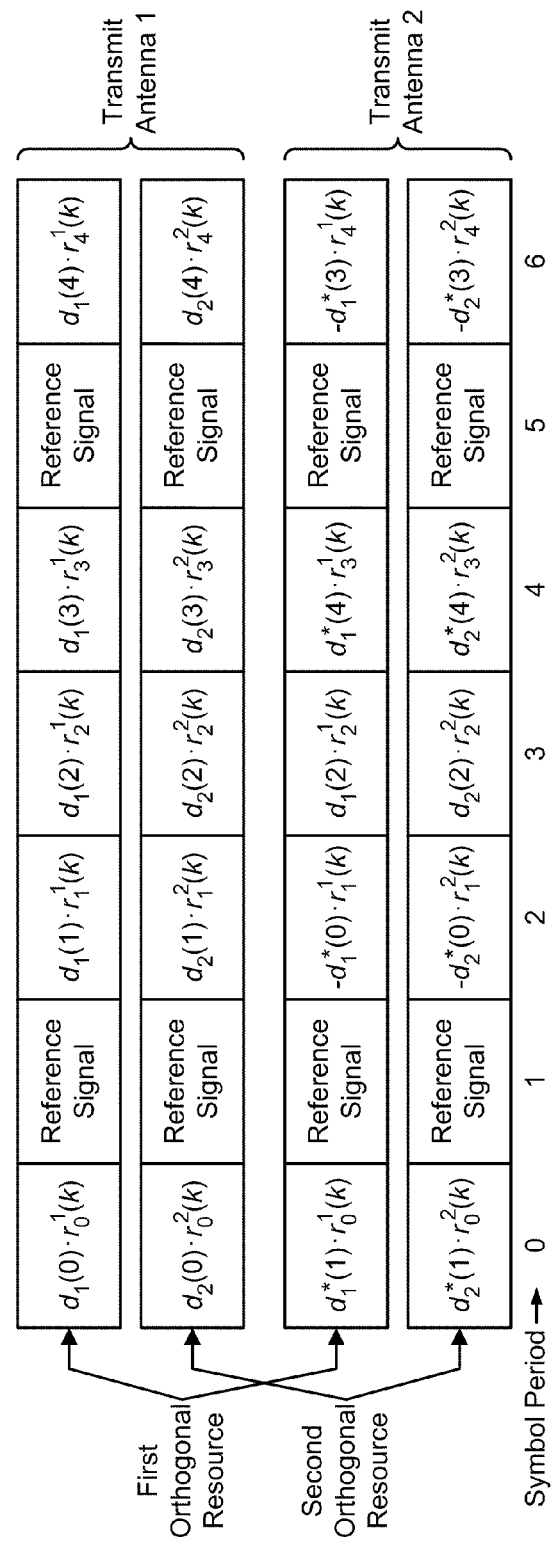
FIG. 8 shows a SORTD with STBC scheme.

FIG. 8 shows a design of the SORTD with STBC scheme for the CQI structure shown in FIG. 3. In the example shown in FIG. 8, modulation symbols are sent in five symbol periods, and reference signals are sent in two symbol periods of one slot. A first pair of modulation symbols $d_1(\mathbf{0})$ and $d_1(\mathbf{1})$ is sent from two transmit antennas in symbol periods 0 and 2 with the STBC scheme using a first orthogonal resource. A second pair of modulation symbols $d_2(\mathbf{0})$ and $d_2(\mathbf{1})$ is sent from the two transmit antennas in symbol periods 0 and 2 with the STBC scheme using a second orthogonal resource. Output symbol sequences for the two transmit antennas may be obtained as shown in equations (12) to (15).

SORTD and STBC are two exemplary schemes that may be used to implement open loop transmit diversity. In general, transmit diversity may be achieved by transmitting data over multiple transmit antennas. Transmit diversity may be open loop when the processing performed by a transmitter (e.g., a UE) is not dependent on feedback information from a receiver (e.g., an eNB). Transmit diversity may also be achieved with other schemes such as cyclic delay diversity (CDD). For the CDD scheme, the output samples in each symbol period may be cyclically shifted in the time domain, with different amounts of cyclic shift being applied for different transmit antennas. The CDD scheme may effectively combine a communication channel from one transmit antenna and a delayed communication channel from the other transmit antenna into one effective channel with a longer delay spread. A larger cyclic shift may be used to achieve good diversity performance. However, a larger cyclic delay (e.g., in integer multiple of output samples) may be equivalent to using different reference signal sequences with different cyclic shifts for the two transmit antennas.

In one design, different orthogonal resources may be assigned to multiple (T) transmit antennas for the SORTD scheme, where T may be two or greater. For example, four orthogonal resources may be assigned to a UE equipped with four transmit antennas. The same or different data may be sent from the T transmit antennas, e.g., as described above in FIGS. 6A through 6D. Different reference signals may be sent from the T transmit antennas to enable estimation of the channel response for each transmit antenna. In another design, the SORTD with STBC scheme may be used for more than two transmit antennas. For example, STBC may be used for a first pair of transmit antennas using one orthogonal resource, and STBC may also be used for a second pair of transmit antennas using another orthogonal resource.

In yet another design, two virtual antennas may be formed when more than two physical antennas are available. It may be desirable to send data from fewer virtual antennas in order to (i) increase the transmit power for the transmission from each virtual antenna and (ii) avoid having to send a separate reference signal from each physical antenna to enable channel estimation for that physical antenna. Performance may degrade due to poor channel estimates.

Figure 9:
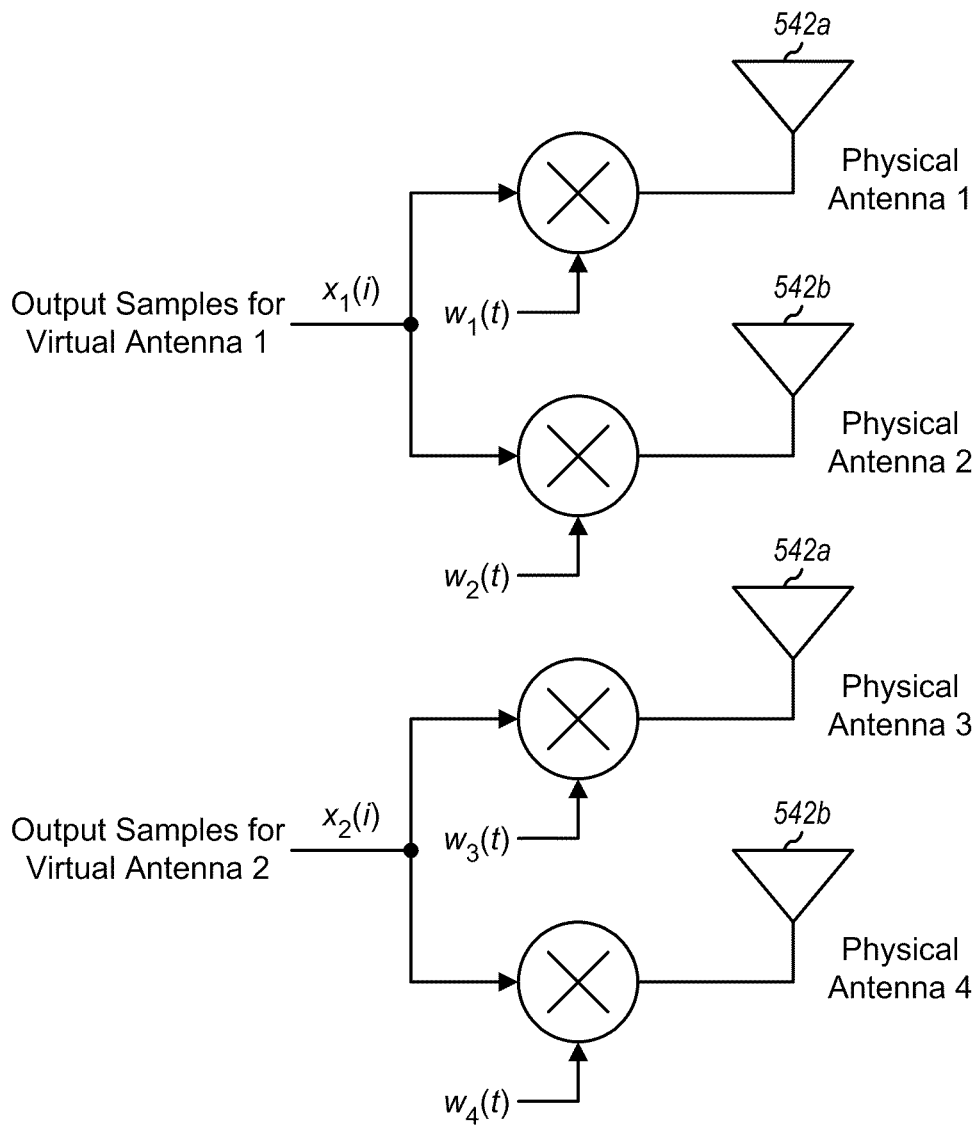
FIG. 9 shows two virtual antennas formed with four physical antennas.

FIG. 9 shows a design of forming two virtual antennas with four physical antennas. In this design, weights $w_1(t)$, $w_2(t)$, $w_3(t)$ and $w_4(t)$ may be applied to four physical antennas 1, 2, 3 and 4 respectively. Output samples $x_1(i)$ for virtual antenna 1 may be (i) multiplied with weight with $w_1(t)$ prior to transmission from physical antenna 1 and (ii) multiplied with weight $w_2(t)$ prior to transmission from physical antenna 2. Similarly, output samples $x_2(i)$ for virtual antenna 2 may be (i) multiplied with weight $w_3(t)$ prior to transmission from physical antenna 3 and (ii) multiplied with weight $w_4(t)$ prior to transmission from physical antenna 4. The weights may randomly hop (e.g., at slot boundary) to avoid possible correlation among the physical antennas. A UE may autonomously select the weights and apply them to both control data and reference signals without having to inform an eNB.

In the design shown in FIG. 9, each physical antenna may be used for only one virtual antenna, which may maintain a single-carrier waveform for each physical antenna. Virtual antennas may also be formed in other manners. In another design, a first virtual antenna may be formed with a first precoding vector of T weights for T physical antennas, and a second virtual antenna may be formed with a second precoding vector of T weights for the T physical antennas. The first precoding vector may be orthogonal to the second precoding vector.

Figures 10, 11:
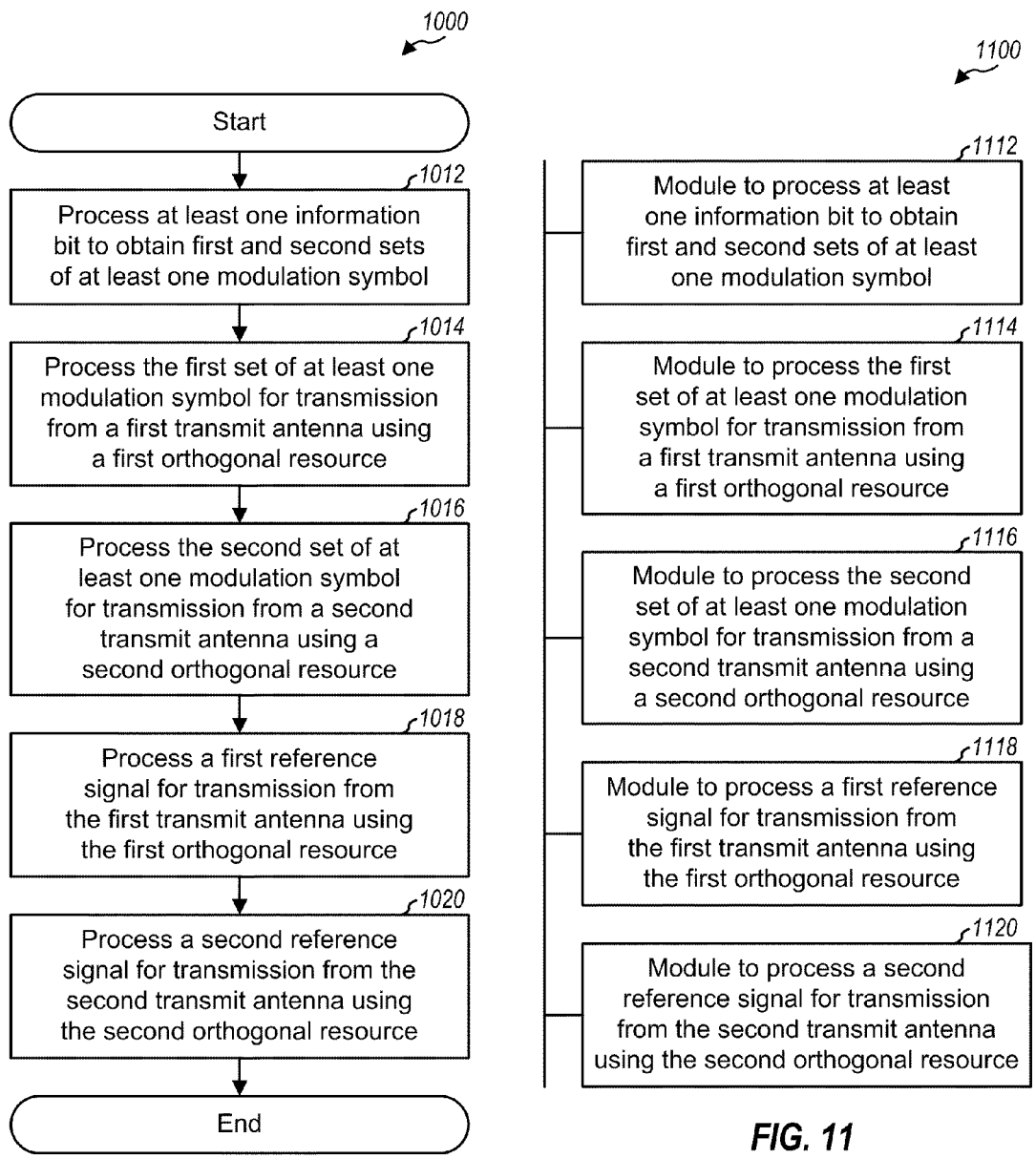
FIGS. 10 and 11 show a process and an apparatus, respectively, for sending data using the SORTD scheme.

FIG. 10 shows a design of a process 1000 for sending data in a wireless communication system. Process 1000 may be performed by a UE (as described below) or by some other entity. The UE may process at least one information bit to obtain (i) a first set of at least one modulation symbol for a first transmit antenna and (ii) a second set of at least one modulation symbol for a second transmit antenna (block 1012). In general, the information bit(s) may be for any type of data, e.g., control data, traffic data, etc. In one design, the information bit(s) may be for CQI information, ACK information, a scheduling request, some other information, or a combination thereof.

The UE may generate modulation symbols for the two transmit antennas in various manners. In one design of block 1012, the UE may encode the information bit(s) to obtain code bits, generate the first set of modulation symbol(s) based on a first subset of the code bits, and generate the second set of modulation symbol(s) based on a second subset of the code bits, e.g., as shown in FIG. 6C. In another design, the UE may generate the first set of modulation symbol(s) based on one or more information bits and may generate the second set of modulation symbol(s) based on one or more additional information bits, e.g., as shown in FIG. 6D. In yet another design, the UE may generate the first set of modulation symbol(s) based on information bits, interleave the information bits to obtain interleaved bits, and generate the second set of modulation symbol(s) based on the interleaved bits, e.g., as shown in FIG. 6B. The UE may also generate the modulation symbols based on the information bit(s) in other manners.

The UE may process the first set of at least one modulation symbol for transmission from the first transmit antenna using a first orthogonal resource (block 1014). The UE may process the second set of at least one modulation symbol for transmission from the second transmit antenna using a second orthogonal resource different from the first orthogonal resource (block 1016). The UE may process a first reference signal for transmission from the first transmit antenna using the first orthogonal resource (block 1018). The UE may also process a second reference signal for transmission from the second transmit antenna using the second orthogonal resource (block 1020).

The first and second orthogonal resources may comprise any type of resources that may be used for transmission. In one design, the first orthogonal resource may comprise a first reference signal sequence associated with a first cyclic shift. The second orthogonal resource may comprise a second reference signal sequence associated with a second cyclic shift that is different from the first cyclic shift. For this design, blocks 1014 and 1016 may be performed as shown in equation (2), and blocks 1018 and 1020 may be performed as shown in equation (3). In another design, the first orthogonal resource may comprise a first set of reference signal sequence and orthogonal sequence(s), e.g., one orthogonal sequence for data and another orthogonal sequence for reference signal. The second orthogonal resource may comprise a second set of reference signal sequence and orthogonal sequence(s) that are different from the first set. For this design, blocks 1014 and 1016 may be performed as shown in equation (4), and blocks 1018 and 1020 may be performed as shown in equation (5).

In one design, the first and second transmit antennas may be two physical antennas. In another design, the first transmit antenna may be a first virtual antenna formed by applying a first set of weights to a first set of physical antennas. The second transmit antenna may be a second virtual antenna formed by applying a second set of weights to a second set of physical antennas. The two virtual antennas may also be formed in other manners.

FIG. 11 shows a design of an apparatus 1100 for sending data in a wireless communication system. Apparatus 1100 includes a module 1112 to process at least one information bit to obtain a first set of at least one modulation symbol for a first transmit antenna and a second set of at least one modulation symbol for a second transmit antenna, a module 1114 to process the first set of at least one modulation symbol for transmission from the first transmit antenna using a first orthogonal resource, a module 1116 to process the second set of at least one modulation symbol for transmission from the second transmit antenna using a second orthogonal resource, a module 1118 to process a first reference signal for transmission from the first transmit antenna using the first orthogonal resource, and a module 1120 to process a second reference signal for transmission from the second transmit antenna using the second orthogonal resource.

FIG. 12 shows a design of a process 1200 for receiving data in a wireless communication system. Process 1200 may be performed by a base station/eNB (as described below) or by some other entity. The eNB may receive a first set of at least one modulation symbol sent from a first transmit antenna using a first orthogonal resource (block 1212). The eNB may also receive a second set of at least one modulation symbol sent from a second transmit antenna using a second orthogonal resource (block 1214). The eNB may receive a first reference signal sent from the first transmit antenna using the first orthogonal resource (block 1216). The eNB may also receive a second reference signal sent from the second transmit antenna using the second orthogonal resource (block 1218). The eNB may derive a first channel estimate for the first transmit antenna based on the first reference signal (block 1220). The eNB may derive a second channel estimate for the second transmit antenna based on the second reference signal (block 1222). The eNB may process the received first and second sets of at least one modulation symbol based on the first and second channel estimates to recover at least one information bit (block 1224).

In one design of block 1224, the eNB may process (e.g., despread and coherently demodulate) received symbols based on the first orthogonal resource and the first channel estimate to obtain first modulation symbol estimates for the first set of at least one modulation symbol. The eNB may also process the received symbols based on the second orthogonal resource and the second channel estimate to obtain second modulation symbol estimates for the second set of at least one modulation symbol. For the joint coding scheme, the eNB may decode the first and second modulation symbol estimates to obtain at least one information bit sent using the first and second orthogonal resources. For the independent coding scheme, the eNB may (i) decode the first modulation symbol estimates to obtain at least one information bit sent using the first orthogonal resource and (ii) decode the second modulation symbol estimates to obtain at least one additional information bit sent using the second orthogonal resource. For the interleaving scheme, the eNB may further combine the information bits from the decoding to obtain final information bit(s).

FIG. 13 shows a design of an apparatus 1300 for receiving data in a wireless communication system. Apparatus 1300 includes a module 1312 to receive a first set of at least one modulation symbol sent from a first transmit antenna using a first orthogonal resource, a module 1314 to receive a second set of at least one modulation symbol sent from a second transmit antenna using a second orthogonal resource, a module 1316 to receive a first reference signal sent from the first transmit antenna using the first orthogonal resource, a module 1318 to receive a second reference signal sent from the second transmit antenna using the second orthogonal resource, a module 1320 to derive a first channel estimate for the first transmit antenna based on the first reference signal, a module 1322 to derive a second channel estimate for the second transmit antenna based on the second reference signal, and a module 1324 to process the received first and second sets of at least one modulation symbol based on the first and second channel estimates to recover at least one information bit.

FIG. 14 shows a design of a process 1400 for sending data based on the SORTD with STBC scheme. Process 1400 may be performed by a UE (as described below) or by some other entity. The UE may jointly encode at least one information bit to obtain first and second sets of modulation symbols. Alternatively, the UE may encode at least one information bit to obtain the first set of modulation symbols and may encode at least one additional information bit to obtain the second set of modulation symbols.

The UE may process the first set of modulation symbols for transmission in two symbol periods from a pair of transmit antennas using a first orthogonal resource (block 1412). The UE may process the second set of modulation symbols for transmission in the two symbol periods from the pair of transmit antennas using a second orthogonal resource (block 1414). The UE may process the first set of modulation symbols in accordance with STBC to obtain a first pair of symbol streams for the pair of transmit antennas. The UE may also process the second set of modulation symbols in accordance with STBC to obtain a second pair of symbol streams for the pair of transmit antennas. The UE may combine the first and second pairs of symbol streams to obtain a final pair of symbol streams for the pair of transmit antennas, e.g., as shown in equations (12) to (15).

FIG. 15 shows a design of an apparatus 1500 for sending data in a wireless communication system. Apparatus 1500 includes a module 1512 to process a first set of modulation symbols for transmission in two symbol periods from a pair of transmit antennas using a first orthogonal resource, and a module 1514 to process a second set of modulation symbols for transmission in the two symbol periods from the pair of transmit antennas using a second orthogonal resource.

FIG. 16 shows a design of a process 1600 for receiving data in a wireless communication system. Process 1600 may be performed by a base station/eNB (as described below) or by some other entity. The eNB may receive a first set of modulation symbols sent in two symbol periods from a pair of transmit antennas using a first orthogonal resource (block 1612). The eNB may also receive a second set of modulation symbols sent in the two symbol periods from the pair of transmit antennas using a second orthogonal resource (block 1614).

In one design, the eNB may process received symbols based on the first orthogonal resource to obtain first detected symbols. The eNB may also process the received symbols based on the second orthogonal resource to obtain second detected symbols. The eNB may process the first detected symbols in accordance with STBC to obtain first modulation symbol estimates. The eNB may also process the second detected symbols in accordance with STBC to obtain second modulation symbol estimates. The eNB may decode the first modulation symbol estimates to obtain at least one information bit sent using the first orthogonal resource. The eNB may also decode the second modulation symbol estimates to obtain at least one additional information bit sent using the second orthogonal resource. The eNB may also jointly decode the first and second modulation symbol estimates to obtain information bits.

FIG. 17 shows a design of an apparatus 1700 for receiving data in a wireless communication system. Apparatus 1700 includes a module 1712 to receive a first set of modulation symbols sent in two symbol periods from a pair of transmit antennas using a first orthogonal resource, and a module 1714 to receive a second set of modulation symbols sent in the two symbol periods from the pair of transmit antennas using a second orthogonal resource.

The modules in FIGS. 11, 13, 15 and 17 may comprise processors, electronic devices, hardware devices, electronic components, logical circuits, memories, software codes, firmware codes, etc., or any combination thereof.

Figure 18:
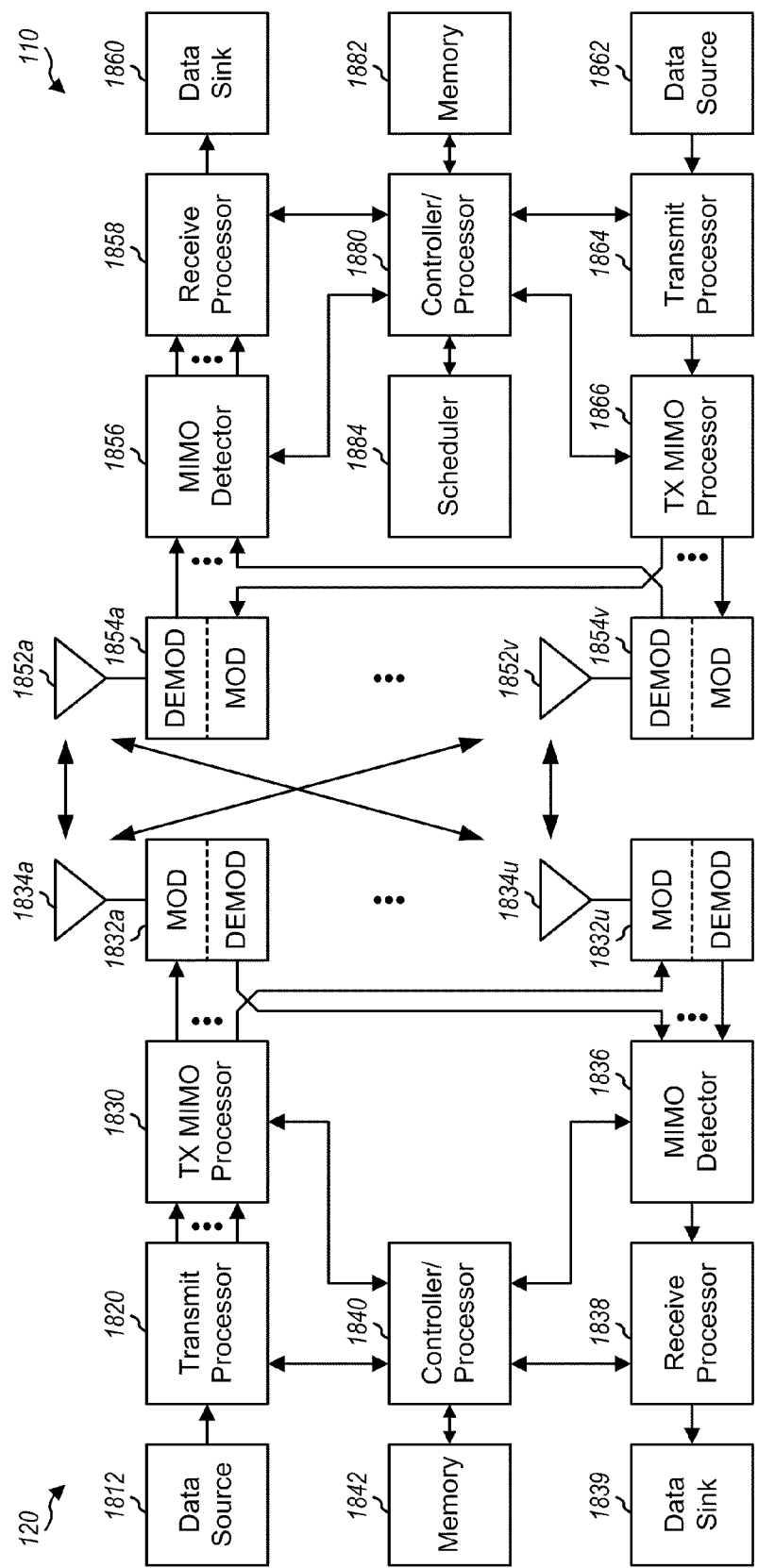
FIG. 18 shows a block diagram of a base station and a UE.

FIG. 18 shows a block diagram of a design of a base station/eNB 110 and a UE 120, which may be one of the eNBs and one of the UEs in FIG. 1. UE 120 may be equipped with U antennas 1834a through 1834u, and eNB 110 may be equipped with V antennas 1852a through 1852v, where in general U≥1 and V≥1.

At UE 120, a transmit processor 1820 may receive traffic data from a data source 1812, process (e.g., encode, interleave, and modulate) the traffic data based on one or more modulation and coding schemes, and provide modulation symbols for traffic data. Transmit processor 1820 may also process control data (e.g., CQI information, ACK information, a scheduling request, etc.) from a controller/processor 1840 and provide modulation symbols for control data. Transmit processor 1820 may implement encoder and modulator 520 in FIG. 5. A transmit (TX) MIMO processor 1830 may perform spatial processing (e.g., precoding) on the symbols from transmit processor 1820, if applicable, and provide U output symbol streams to U modulators (MODs) 1832a through 1832u. Each modulator 1832 may process a respective output symbol stream (e.g., for SC-FDMA) to obtain an output sample stream. Each modulator 1832 may implement sequence modulator and spreader 530 in FIG. 5. Each modulator 1832 may further process (e.g., convert to analog, amplify, filter, and upconvert) the output sample stream to obtain an uplink signal. U uplink signals from modulators 1832a through 1832u may be transmitted via U antennas 1834a through 1834u, respectively.

At eNB 110, antennas 1852a through 1852v may receive the uplink signals from UE 120 and provide received signals to demodulators (DEMODs) 1854a through 1854v, respectively. Each demodulator 1854 may condition (e.g., filter, amplify, downconvert, and digitize) a respective received signal to obtain received samples. Each demodulator 1854 may further process the received samples to obtain input symbols. A MIMO detector 1856 may obtain input symbols from all R demodulators 1854a through 1854v, perform MIMO detection on the input symbols if applicable, and provide detected symbols. A receive processor 1858 may process (e.g., demodulate, deinterleave, and decode) the detected symbols, provide decoded traffic data to a data sink 1860, and provide decoded control data to a controller/processor 1880.

On the downlink, at eNB 110, traffic data from a data source 1862 and control data from controller/processor 1880 may be processed by a transmit processor 1864, precoded by a TX MIMO processor 1866 if applicable, conditioned by modulators 1854a through 1854v, and transmitted to UE 120. At UE 120, the downlink signals from eNB 110 may be received by antennas 1834, conditioned by demodulators 1832, processed by a MIMO detector 1836 if applicable, and further processed by a receive processor 1838 to obtain the traffic data and control data sent to UE 120. The obtained data may be provided to a data sink 1839.

Controllers/processors 1840 and 1880 may direct the operation at UE 120 and eNB 110, respectively. Processor 1840 and/or other processors and modules at UE 120 may perform or direct process 1000 in FIG. 10, process 1400 in FIG. 14, and/or other processes for the techniques described herein. Processor 1880 and/or other processors and modules at eNB 110 may perform or direct process 1200 in FIG. 12, process 1600 in FIG. 16, and/or other processes for the techniques described herein. Memories 1842 and 1882 may store data and program codes for UE 120 and eNB 110, respectively. A scheduler 1884 may schedule UEs for transmission and may provide allocations of resources (e.g., orthogonal resources, resource blocks, etc.) for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending data in a wireless communication system, comprising:
   determining a first orthogonal resource to use for a first transmit antenna at a transmitter, wherein the first orthogonal resource generates a first reference signal using:
      a first reference signal sequence, and
      at least one first orthogonal sequence;
   determining a second orthogonal resource to use for a second transmit antenna at the transmitter, wherein the second orthogonal resource generates a second reference signal using:
      a second reference signal sequence, and
      at least one second orthogonal sequence;
   processing a first set of at least one modulation symbol and the first reference signal for transmission from the first transmit antenna at the transmitter using the first orthogonal resource; and
   processing a second set of at least one modulation symbol and the second reference signal for transmission from the second transmit antenna at the transmitter using the second orthogonal resource.

2. The method of claim 1, wherein the first orthogonal resource comprises the first reference signal sequence generated based on a first cyclic shift of a base sequence, and wherein the second orthogonal resource comprises the second reference signal sequence generated based on a second cyclic shift of the base sequence.

3. The method of claim 1, further comprising:
   generating the first and second sets of at least one modulation symbol based on channel quality indicator (CQI) information, or acknowledgement (ACK) information, or a scheduling request, or a combination thereof.

4. The method of claim 1, further comprising:
   generating the first set of at least one modulation symbol based on at least one bit of acknowledgement (ACK) information; and
   generating the second set of at least one modulation symbol based on at least one additional bit of ACK information.

5. The method of claim 1, further comprising:
   generating the first set of at least one modulation symbol based on information bits;
   interleaving the information bits to obtain interleaved bits; and
   generating the second set of at least one modulation symbol based on the interleaved bits.

6. The method of claim 1, further comprising:
   encoding at least one information bit to obtain code bits;
   generating the first set of at least one modulation symbol based on a first subset of the code bits; and
   generating the second set of at least one modulation symbol based on a second subset of the code bits.

7. The method of claim 1, further comprising:
   generating the first set of at least one modulation symbol based on at least one information bit; and
   generating the second set of at least one modulation symbol based on at least one additional information bit.

8. The method of claim 1, further comprising:
   applying a first set of weights to a first set of physical antennas to form the first transmit antenna; and
   applying a second set of weights to a second set of physical antennas to form the second transmit antenna.

9. The method of claim 1, wherein the first orthogonal resource comprises a first orthogonal sequence, and wherein the second orthogonal resource comprises a second orthogonal sequence.

10. The method of claim 1, further comprising:
    generating a first set of single-carrier frequency division multiple access (SC-FDMA) symbols comprising the first set of at least one modulation symbol; and
    generating a second set of SC-FDMA symbols comprising the second set of at least one modulation symbol.

11. The method of claim 1, wherein the first set of at least one modulation symbol is same as the second set of at least one modulation symbol.

12. The method of claim 1, wherein the first set of at least one modulation symbol is different from the second set of at least one modulation symbol.

13. An apparatus for wireless communication, comprising:
    means for determining a first orthogonal resource to use for a first transmit antenna at a transmitter, wherein the first orthogonal resource generates a first reference signal using:
       a first reference signal sequence, and
       at least one first orthogonal sequence;
    means for determining a second orthogonal resource to use for a second transmit antenna at the transmitter, wherein the second orthogonal resource generates a second reference signal using:
       a second reference signal sequence, and
       at least one second orthogonal sequence;
    means for processing a first set of at least one modulation symbol and the first reference signal for transmission from the first transmit antenna at the transmitter using the first orthogonal resource; and
    means for processing a second set of at least one modulation symbol and the second reference signal for transmission from the second transmit antenna at the transmitter using the second orthogonal resource.

14. The apparatus of claim 13, further comprising:
    means for encoding at least one information bit to obtain code bits;
    means for generating the first set of at least one modulation symbol based on a first subset of the code bits; and
    means for generating the second set of at least one modulation symbol based on a second subset of the code bits.

15. The apparatus of claim 13, further comprising:
    means for generating the first set of at least one modulation symbol based on at least one information bit; and
    means for generating the second set of at least one modulation symbol based on at least one additional information bit.

16. The apparatus of claim 13, further comprising:
    means for generating a first set of single-carrier frequency division multiple access (SC-FDMA) symbols comprising the first set of at least one modulation symbol; and
    means for generating a second set of SC-FDMA symbols comprising the second set of at least one modulation symbol.

17. The apparatus of claim 13, wherein the first set of at least one modulation symbol is same as the second set of at least one modulation symbol.

18. The apparatus of claim 13, wherein the first set of at least one modulation symbol is different from the second set of at least one modulation symbol.

19. An apparatus for wireless communication, comprising:
at least one processor configured to:
determine a first orthogonal resource to use for a first transmit antenna at a transmitter, wherein the first orthogonal resource generates a first reference signal using:
a first reference signal sequence, and
at least one first orthogonal sequence,
determine a second orthogonal resource to use for a second transmit antenna at the transmitter, wherein the second orthogonal resource generates a second reference signal using:
a second reference signal sequence, and
at least one second orthogonal sequence,
process a first set of at least one modulation symbol and the first reference signal for transmission from the first transmit antenna at the transmitter using the first orthogonal resource, and
process a second set of at least one modulation symbol and the second reference signal for transmission from the second transmit antenna at the transmitter using the second orthogonal resource.

20. The apparatus of claim 19, wherein the at least one processor is configured to encode at least one information bit to obtain code bits, to generate the first set of at least one modulation symbol based on a first subset of the code bits, and to generate the second set of at least one modulation symbol based on a second subset of the code bits.

21. The apparatus of claim 19, wherein the at least one processor is configured to generate the first set of at least one modulation symbol based on at least one information bit, and to generate the second set of at least one modulation symbol based on at least one additional information bit.

22. The apparatus of claim 19, wherein the at least one processor is configured to:
generate a first set of single-carrier frequency division multiple access (SC-FDMA) symbols comprising the first set of at least one modulation symbol, and
generate a second set of SC-FDMA symbols comprising the second set of at least one modulation symbol.

23. The apparatus of claim 19, wherein the first set of at least one modulation symbol is same as the second set of at least one modulation symbol.

24. The apparatus of claim 19, wherein the first set of at least one modulation symbol is different from the second set of at least one modulation symbol.

25. A method of receiving data in a wireless communication system, comprising:
determining a first orthogonal resource used for a first transmit antenna at a transmitter, wherein the first orthogonal resource generates a first reference signal using:
a first reference signal sequence, and
at least one first orthogonal sequence;
determining a second orthogonal resource used for a second transmit antenna at the transmitter, wherein the second orthogonal resource generates a second reference signal using:
a second reference signal sequence, and
at least one second orthogonal sequence;
receiving a first set of at least one modulation symbol and the first reference signal sent from the first transmit antenna at the transmitter using the first orthogonal resource; and receiving a second set of at least one modulation symbol and the second reference signal sent from the second transmit antenna at the transmitter using the second orthogonal resource.

26. The method of claim 25, further comprising:
deriving a first channel estimate for the first transmit antenna based on the first reference signal; and
deriving a second channel estimate for the second transmit antenna based on the second reference signal.

27. The method of claim 25, further comprising:
processing received symbols based on the first orthogonal resource to obtain first modulation symbol estimates for the first set of at least one modulation symbol;
processing the received symbols based on the second orthogonal resource to obtain second modulation symbol estimates for the second set of at least one modulation symbol; and
decoding the first and second modulation symbol estimates to obtain at least one information bit.

28. The method of claim 25, further comprising:
processing received symbols based on the first orthogonal resource to obtain first modulation symbol estimates for the first set of at least one modulation symbol;
processing the received symbols based on the second orthogonal resource to obtain second modulation symbol estimates for the second set of at least one modulation symbol;
decoding the first modulation symbol estimates to obtain at least one information bit; and
decoding the second modulation symbol estimates to obtain at least one additional information bit.

29. The method of claim 25, further comprising:
receiving a first set of single-carrier frequency division multiple access (SC-FDMA) symbols comprising the first set of at least one modulation symbol; and
receiving a second set of SC-FDMA symbols comprising the second set of at least one modulation symbol.

30. The method of claim 25, wherein the first set of at least one modulation symbol is same as the second set of at least one modulation symbol.

31. The method of claim 25, wherein the first set of at least one modulation symbol is different from the second set of at least one modulation symbol.

32. An apparatus for wireless communication, comprising:
means for determining a first orthogonal resource used for a first transmit antenna at a transmitter, wherein the first orthogonal resource generates a first reference signal using:
a first reference signal sequence, and
at least one first orthogonal sequence;
means for determining a second orthogonal resource used for a second transmit antenna at the transmitter, wherein the second orthogonal resource generates a second reference signal using:
a second reference signal sequence, and
at least one second orthogonal sequence;
means for receiving a first set of at least one modulation symbol and the first reference signal sent from the first transmit antenna at the transmitter using the first orthogonal resource; and
means for receiving a second set of at least one modulation symbol and the second reference signal sent from the second transmit antenna at the transmitter using the second orthogonal resource.

33. The apparatus of claim 32, further comprising:
means for deriving a first channel estimate for the first transmit antenna based on the first reference signal; and means for deriving a second channel estimate for the second transmit antenna based on the second reference signal.

34. The apparatus of claim 32, further comprising:
means for processing received symbols based on the first orthogonal resource to obtain first modulation symbol estimates for the first set of at least one modulation symbol;
means for processing the received symbols based on the second orthogonal resource to obtain second modulation symbol estimates for the second set of at least one modulation symbol; and
means for decoding the first and second modulation symbol estimates to obtain at least one information bit.

35. The apparatus of claim 32, further comprising:
means for processing received symbols based on the first orthogonal resource to obtain first modulation symbol estimates for the first set of at least one modulation symbol;
means for processing the received symbols based on the second orthogonal resource to obtain second modulation symbol estimates for the second set of at least one modulation symbol;
means for decoding the first modulation symbol estimates to obtain at least one information bit; and
means for decoding the second modulation symbol estimates to obtain at least one additional information bit.

36. The apparatus of claim 32, further comprising:
means for receiving a first set of single-carrier frequency division multiple access (SC-FDMA) symbols comprising the first set of at least one modulation symbol; and
means for receiving a second set of SC-FDMA symbols comprising the second set of at least one modulation symbol.

37. The apparatus of claim 32, wherein the first set of at least one modulation symbol is same as the second set of at least one modulation symbol.

38. The apparatus of claim 32, wherein the first set of at least one modulation symbol is different from the second set of at least one modulation symbol.

39. A method of sending data in a wireless communication system, comprising:
determining first and second orthogonal resources to use for a pair of transmit antennas at a transmitter, wherein the first orthogonal resource generates a first reference signal using:
a first reference signal sequence, and
at least one first orthogonal sequence, and wherein the second orthogonal resource generates a second reference signal using:
a second reference signal sequence, and
at least one second orthogonal sequence;
processing a first set of modulation symbols and the first reference signal for transmission in two symbol periods from the pair of transmit antennas at the transmitter using the first orthogonal resource; and
processing a second set of modulation symbols and the second reference signal for transmission in the two symbol periods from the pair of transmit antennas using the second orthogonal resource.

40. The method of claim 39, wherein the processing the first set of modulation symbols comprises processing the first set of modulation symbols in accordance with space time block code (STBC) to obtain a first pair of symbol streams for transmission from the pair of transmit antennas, and wherein the processing the second set of modulation symbols comprises processing the second set of modulation symbols in accordance with STBC to obtain a second pair of symbol streams for transmission from the pair of transmit antennas.

41. The method of claim 39, further comprising:
encoding at least one information bit to obtain code bits;
generating the first set of modulation symbols based on a first subset of the code bits; and
generating the second set of modulation symbols based on a second subset of the code bits.

42. The method of claim 39, further comprising:
generating the first set of modulation symbols based on at least one information bit; and
generating the second set of modulation symbols based on at least one additional information bit.

43. An apparatus for wireless communication, comprising:
means for determining first and second orthogonal resources to use for a pair of transmit antennas at a transmitter, wherein the first orthogonal resource generates a first reference signal using:
a first reference signal sequence, and
at least one first orthogonal sequence, and wherein the second orthogonal resource generates a second reference signal using:
a second reference signal sequence, and
at least one second orthogonal sequence;
means for processing a first set of modulation symbols and the first reference signal for transmission in two symbol periods from the pair of transmit antennas at the transmitter using the first orthogonal resource; and
means for processing a second set of modulation symbols and the second reference signal for transmission in the two symbol periods from the pair of transmit antennas using the second orthogonal resource.

44. The apparatus of claim 43, wherein the means for processing the first set of modulation symbols comprises means for processing the first set of modulation symbols in accordance with space time block code (STBC) to obtain a first pair of symbol streams for transmission from the pair of transmit antennas, and wherein the means for processing the second set of modulation symbols comprises means for processing the second set of modulation symbols in accordance with STBC to obtain a second pair of symbol streams for transmission from the pair of transmit antennas.

45. A method of receiving data in a wireless communication system, comprising:
determining first and second orthogonal resources used for a pair of transmit antennas at a transmitter, wherein the first orthogonal resource generates a first reference signal using:
a first reference signal sequence, and
at least one first orthogonal sequence, and wherein the second orthogonal resource generates a second reference signal using:
a second reference signal sequence, and
at least one second orthogonal sequence;
receiving a first set of modulation symbols and the first reference signal sent in two symbol periods from the pair of transmit antennas at the transmitter using the first orthogonal resource; and
receiving a second set of modulation symbols and the second reference signal sent in the two symbol periods from the pair of transmit antennas using the second orthogonal resource.

46. The method of claim 45, further comprising:
processing received symbols based on the first orthogonal resource to obtain first detected symbols;
processing the received symbols based on the second orthogonal resource to obtain second detected symbols;

processing the first detected symbols in accordance with space time block code (STBC) to obtain first modulation symbol estimates for the first set of modulation symbols; and processing the second detected symbols in accordance with STBC to obtain second modulation symbol estimates for the second set of modulation symbols.

47. The method of claim 46, further comprising:

decoding the first modulation symbol estimates to obtain at least one information bit sent using the first orthogonal resource; and decoding the second modulation symbol estimates to obtain at least one additional information bit sent using the second orthogonal resource.

48. The method of claim 46, further comprising:

decoding the first and second modulation symbol estimates to obtain at least one information bit sent using the first and second orthogonal resources.

49. An apparatus for wireless communication, comprising:

means for determining first and second orthogonal resources used for a pair of transmit antennas at a transmitter, wherein the first orthogonal resource generates a first reference signal using:
 a first reference signal sequence, and
 at least one first orthogonal sequence, and wherein the second orthogonal resource generates a second reference signal using:
 a second reference signal sequence, and
 at least one second orthogonal sequence;

means for receiving a first set of modulation symbols and the first reference signal sent in two symbol periods from the pair of transmit antennas at the transmitter using the first orthogonal resource; and means for receiving a second set of modulation symbols and the second reference signal sent in the two symbol periods from the pair of transmit antennas using the second orthogonal resource.

50. The apparatus of claim 49, further comprising:

means for processing received symbols based on the first orthogonal resource to obtain first detected symbols;

means for processing the received symbols based on the second orthogonal resource to obtain second detected symbols;

means for processing the first detected symbols in accordance with space time block code (STBC) to obtain first modulation symbol estimates for the first set of modulation symbols; and means for processing the second detected symbols in accordance with STBC to obtain second modulation symbol estimates for the second set of modulation symbols.

51. A computer program product, comprising:

a non-transitory computer-readable medium comprising:

code for causing at least one processor to determine a first orthogonal resource to use for a first transmit antenna at a transmitter, wherein the first orthogonal resource generates a first reference signal using:
 a first reference signal sequence, and
 at least one first orthogonal sequence, code for causing the at least one processor to determine a second orthogonal resource to use for a second transmit antenna at the transmitter, wherein the second orthogonal resource generates a second reference signal using:
 a second reference signal sequence, and
 at least one second orthogonal sequence, code for causing the at least one processor to process a first set of at least one modulation symbol and the first reference signal for transmission from the first transmit antenna at the transmitter using the first orthogonal resource, and code for causing the at least one processor to process a second set of at least one modulation symbol and the second reference signal for transmission from the second transmit antenna at the transmitter using the second orthogonal resource.

52. An apparatus for wireless communication, comprising:

at least one processor configured to:

determine a first orthogonal resource used for a first transmit antenna at a transmitter, wherein the first orthogonal resource generates a first reference signal using:
 a first reference signal sequence, and
 at least one first orthogonal sequence, determine a second orthogonal resource used for a second transmit antenna at the transmitter, wherein the second orthogonal resource generates a second reference signal using:
 a second reference signal sequence, and
 at least one second orthogonal sequence, receive a first set of at least one modulation symbol and the first reference signal sent from the first transmit antenna at the transmitter using the first orthogonal resource, and receive a second set of at least one modulation symbol and the second reference signal sent from the second transmit antenna at the transmitter using the second orthogonal resource.

53. The apparatus of claim 52, wherein the at least one processor is to derive a first channel estimate for the first transmit antenna based on the first reference signal, and to derive a second channel estimate for the second transmit antenna based on the second reference signal.

54. The apparatus of claim 52, wherein the at least one processor is configured to process received symbols based on the first orthogonal resource to obtain first modulation symbol estimates for the first set of at least one modulation symbol, to process the received symbols based on the second orthogonal resource to obtain second modulation symbol estimates for the second set of at least one modulation symbol, and to decode the first and second modulation symbol estimates to obtain at least one information bit.

55. The apparatus of claim 52, wherein the at least one processor is configured to process received symbols based on the first orthogonal resource to obtain first modulation symbol estimates for the first set of at least one modulation symbol, to process the received symbols based on the second orthogonal resource to obtain second modulation symbol estimates for the second set of at least one modulation symbol, to decode the first modulation symbol estimates to obtain at least one information bit, and to decode the second modulation symbol estimates to obtain at least one additional information bit.

56. The apparatus of claim 52, wherein the at least one processor is configured to:

receive a first set of single-carrier frequency division multiple access (SC-FDMA) symbols comprising the first set of at least one modulation symbol, and receive a second set of SC-FDMA symbols comprising the second set of at least one modulation symbol.

57. The apparatus of claim 52, wherein the first set of at least one modulation symbol is same as the second set of at least one modulation symbol.

58. The apparatus of claim 52, wherein the first set of at least one modulation symbol is different from the second set of at least one modulation symbol.

59. A computer program product, comprising:

a non-transitory computer-readable medium comprising:

code for causing at least one processor to determine a first orthogonal resource used for a first transmit antenna at a transmitter, wherein the first orthogonal resource generates a first reference signal using:

a first reference signal sequence, and at least one first orthogonal sequence, code for causing the at least one processor to determine a second orthogonal resource used for a second transmit antenna at the transmitter, wherein the second orthogonal resource generates a second reference signal using:

a second reference signal sequence, and at least one second orthogonal sequence, code for causing the at least one processor to receive a first set of at least one modulation symbol and the first reference signal sent from the first transmit antenna at the transmitter using the first orthogonal resource, and code for causing the at least one processor to receive a second set of at least one modulation symbol and the second reference signal sent from the second transmit antenna at the transmitter using the second orthogonal resource.

* * * * *